US006270546B1

(12) United States Patent
Jeanseau et al.

(10) Patent No.: US 6,270,546 B1
(45) Date of Patent: Aug. 7, 2001

(54) INDIVIDUALLY PIN-SUPPORTED FILTER UNITS FOR A CLEAN ROOM SYSTEM

(75) Inventors: Peter Jeanseau, San Clemente; Richard Braman, Newport Beach, both of CA (US)

(73) Assignee: HEPA Corporation, Anaheim, CA (US)

( * ) Notice: Subject to any disclaimer, the term of this patent is extended or adjusted under 35 U.S.C. 154(b) by 0 days.

(21) Appl. No.: 09/775,990

(22) Filed: Jan. 31, 2001

Related U.S. Application Data

(63) Continuation of application No. 09/370,069, filed on Aug. 6, 1999, now Pat. No. 6,190,431, which is a continuation-in-part of application No. 09/249,948, filed on Feb. 12, 1999, now Pat. No. 6,183,528, which is a division of application No. 08/850,714, filed on May 2, 1997, now Pat. No. 5,871,556
(60) Provisional application No. 60/095,738, filed on Aug. 7, 1998, now abandoned.

(51) Int. Cl.[7] .................................................. B01D 46/00
(52) U.S. Cl. .......................... 55/385.2; 55/484; 55/502; 55/508; 454/187
(58) Field of Search .................................. 55/385.2, 483, 55/484, 497, 502, 508; 52/506.06, 506.08; 454/187

(56) References Cited

U.S. PATENT DOCUMENTS

| 3,350,862 | * | 11/1967 | Nutting ................................. 55/484 |
| 3,383,811 | * | 5/1968 | Ades ................................. 52/506.06 |
| 3,525,200 | * | 8/1970 | Smith ................................. 55/484 |
| 3,570,385 | * | 3/1971 | Heisterkamp ....................... 454/187 |
| 3,782,082 | * | 1/1974 | Smith et al. ........................ 55/484 |
| 3,986,850 | * | 10/1976 | Wilcox ............................... 55/385.2 |
| 5,329,739 | * | 7/1994 | Madl, Jr. ........................... 52/506.06 |
| 5,871,556 | * | 2/1999 | Jeanseau et al. .................. 55/385.2 |
| 6,190,431 | * | 2/2001 | Jeanseau et al. .................. 55/385.2 |

* cited by examiner

Primary Examiner—C. Scott Bushey
(74) Attorney, Agent, or Firm—Louis J. Bachand

(57) ABSTRACT

A clean room filter array including a plurality of individual filter units arranged for delivery of filtered air to a clean room is supported by an individual suspension assembly including a fastener pin at outturned flanges of each filter unit that is unshared with any other filter unit so that the filter unit of a frame and fixed filter media is shiftable to and from the array independently of shifting the position or orientation of the other filter units or altering their respective suspension assemblies.

10 Claims, 18 Drawing Sheets

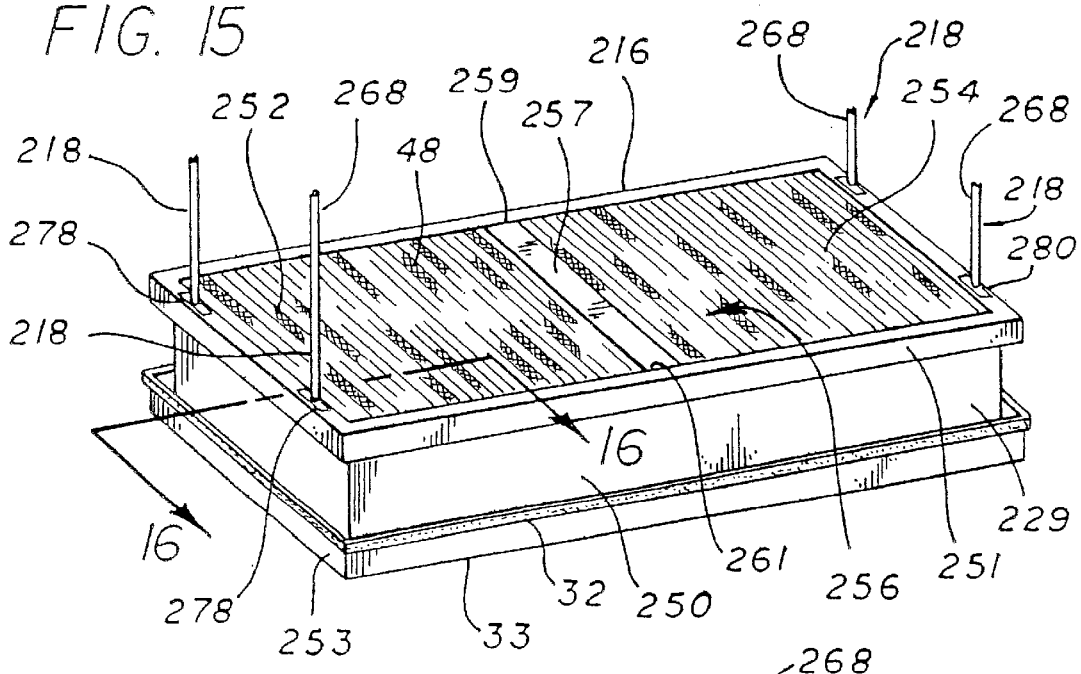

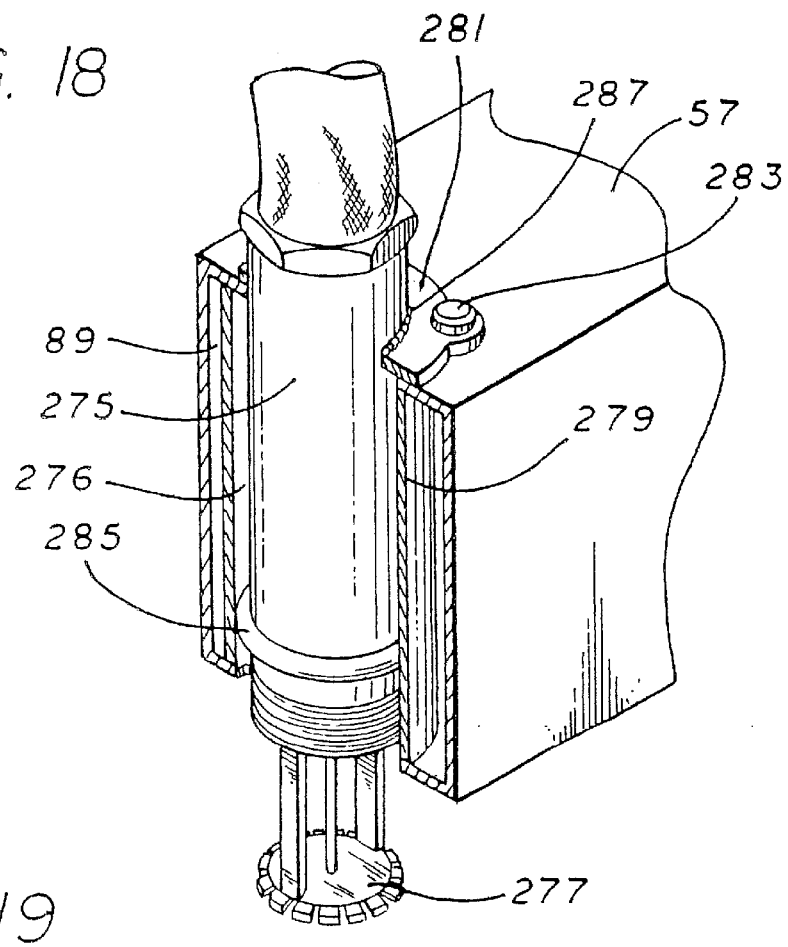
FIG. 18
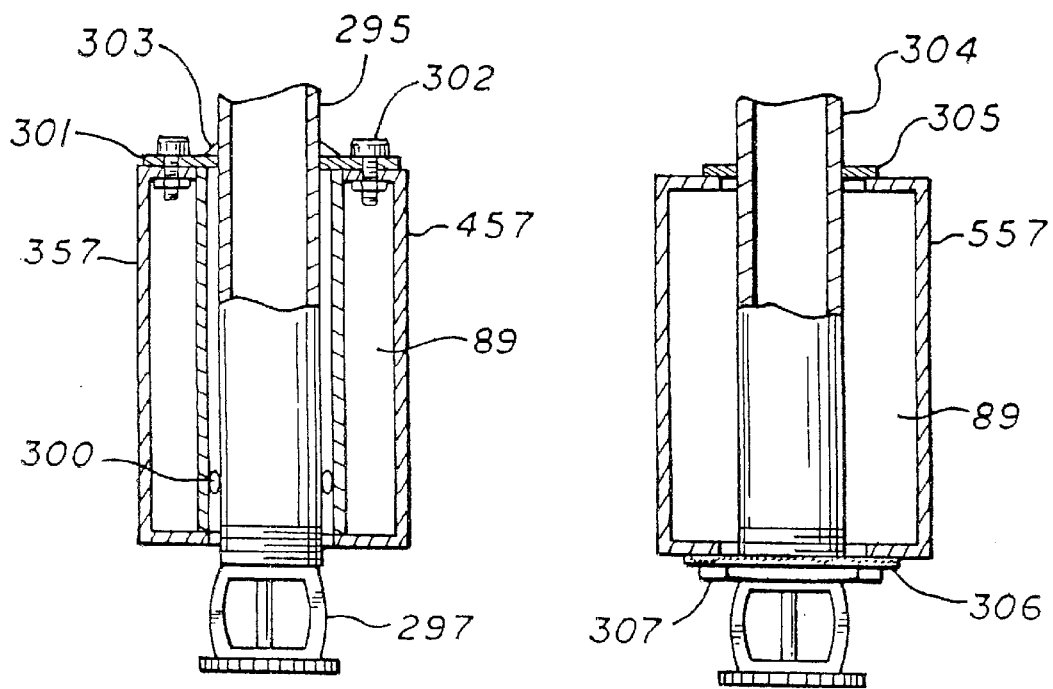
FIG. 19
FIG. 20

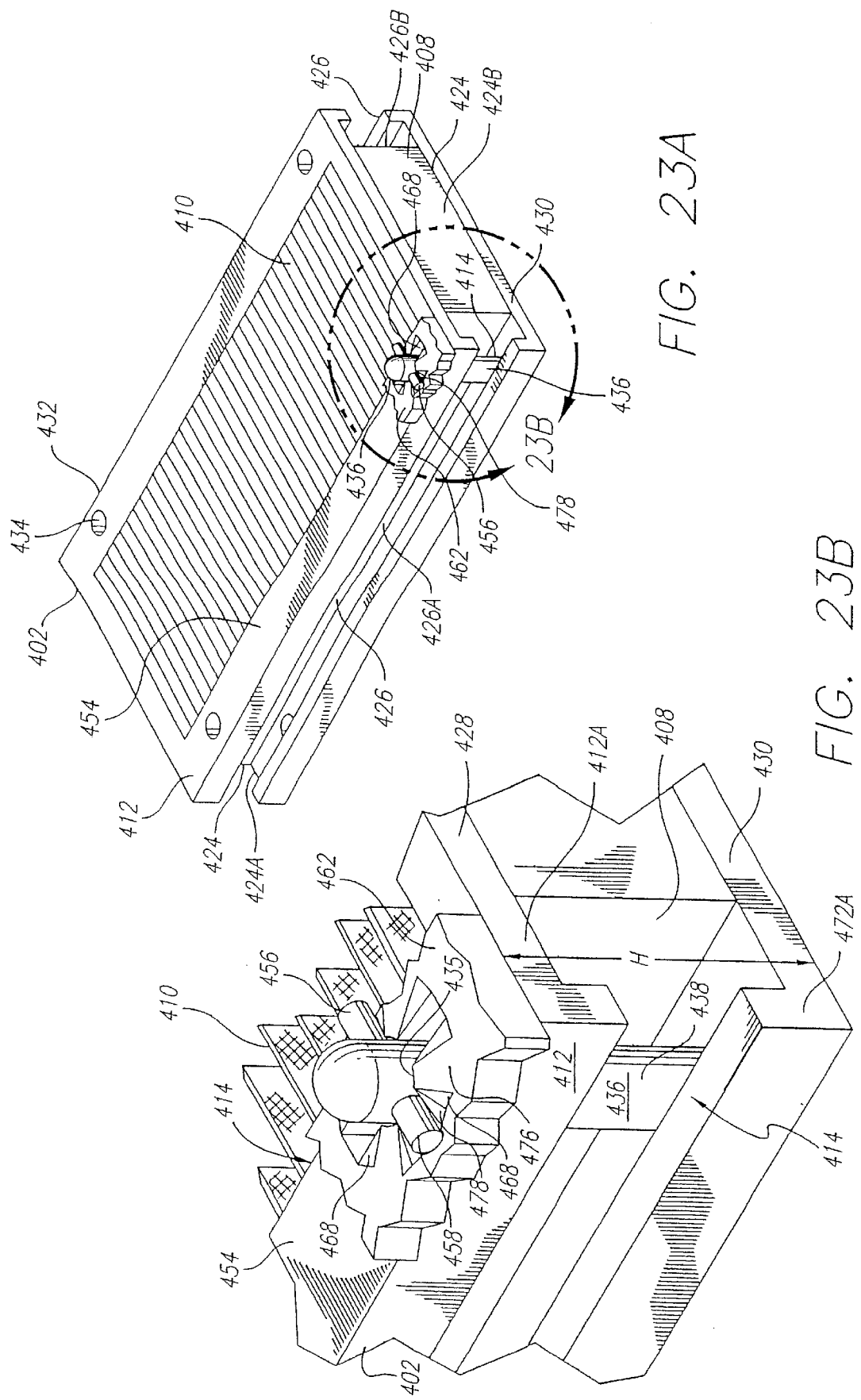

INDIVIDUALLY PIN-SUPPORTED FILTER UNITS FOR A CLEAN ROOM SYSTEM

REFERENCE TO RELATED APPLICATIONS

This application is a continuation of U.S. patent application Ser. No. 09/370,069, filed Aug. 6, 1999, now U.S. Pat. No. 6,190,431 which in turn is a continuation-in-part of U.S. patent application Ser. No. 09/249,948 filed Feb. 12, 1999, now U.S. Pat. No. 6,183,528, which in turn is a divisional application of U.S. patent application Ser. No. 08/850,714 filed May 2, 1997, now U.S. Pat. No. 5,871,556. This application further claims the benefit of U.S. Provisional Application, Ser. No. 60/095,738, filed Aug. 7, 1998, now abandoned.

FIELD OF THE INVENTION

This application relates to construction of clean rooms, and more particularly HEPA, ULPA and like high efficiency air filter systems for clean rooms. Clean rooms are enclosed spaces wherein the ambient air is repeatedly filtered to be substantially free of particulates, e.g., installations in which air is highly filtered to maintain an absence of particulates larger than 0.3 micron size, with HEPA filters, or larger than 0.12 micron size with ULPA filters. The term "HEPA" will be used herein to refer to either or both of HEPA and ULPA filters and other like high efficiency filters. Clean rooms are commonly used in the pharmaceutical, medical and electronic industries.

BACKGROUND OF THE INVENTION

Typically, an array of filter units is disposed above or to the side of a clean room. The term "clean room ceiling" herein refers to either an overhead array, or a to-the-side, sidewall array of filter units. In either case the room air is collected, recycled, and brought under pressure to the filter units. A volume of air to be filtered is typically pressurized on the upstream side of the filter unit to enable flow through the filter media. The term "plenum" herein refers to that space in which air is at a relatively higher pressure before flow through the filter media than on the outlet side of the filter. In a large filter installation the plenum is a large volume space above the clean room ceiling. In a small installation, such as a bench apparatus, the filter unit is typically combined in a housing with a fan, which serves to pressurize the air for through-filter media flow. The plenum-contained, pressurized air passes through the rear face of the filter units, through the filter media within the filter units and to the front face of the filter units for reintroduction into the clean room or toward the bench.

Because the filter units are of relatively limited size, a typical unit being only two feet by four feet, and the frequent need to cover a greatly extended area over a clean room, often the size of several football fields, multiple ones of the filter units are mounted adjacent one another in a laterally and longitudinally extended array, and the array sealed against leakage of unfiltered air from the plenum. The filter array mounting and sealing challenge has been met in the past by erecting extensive grids, suspended from above, onto which the filter units are placed. These grids often take the form of troughs with the individual filter units being fitted into a given rectangle of the grid with a projecting portion of the filter units being immersed in a gel sealant carried in the trough. The sealant and filter unit portions cooperate to block air flow from the plenum from entering the clean room except through the filter units. The grid troughs have a certain width, which increases the lateral spacing between filter units, ironically increasing the paths for sideflows of unfiltered air. In addition, the trough width reduces the proportion of filtered air area in the clean room ceiling, and induces turbulent air flow between the filter units, causing vibration.

Gel sealants to be effective must retain some elasticity or capacity to flow, despite years in place, so as to continually bear against the filter unit portions in the trough despite aging of the gel and vibration of the filter units. Replacement of the HEPA filter units as they become inefficient is a burdensome task. The individual units must be lifted up and away from the gelatinous mass in the troughs sufficiently to clear the trough edges, tipped or somehow angled so as to pass through the grid opening defined by the troughs, and carried out of the grid. Clinging gelatinous sealant can be messy. The installation of the new filter unit repeats these steps in reverse. More gel sealant may need to be added; these gels are quite expensive.

In U.S. Pat. No. 4,883,511 to Gustin et al, a clean room ceiling system is shown which uses gel sealants to seal filter units held in a vertically staggered array to support each other without use of a planar grid of troughs. In U.S. Pat. No. 5,329,739, the patentee Madl describes a clean room filter system in which clusters of four filter units are supported together at the intersection of their respective corners by a disk overlapping each corner, the disk depending from a support surface such as a ceiling. Gel sealant carried on sealing strips seals the filter units against unfiltered air leakage. Mini grid assemblies have been proposed in which four filter units are supported on a common grid section, the grid section being supported from above by rods at corners of the grid section in German No. 3719734 A. In the parent application of this application, now U.S. Pat. No. 5,871,556, individually supported filter units were first disclosed; these used a suspension bracket within the filter unit to anchor to a fastener that depended from the ceiling or other support so that the filter units could be simply pressed into place from io below the ceiling without disturbing the other filter units adjacent.

BRIEF SUMMARY OF THE INVENTION

The present invention provides a different support system for individually supported filter units, one using in a preferred mode a series of fastener pins that engage a suspension support such as a horizontal plate carried on a suspension rod to support the filter units by an outturned flange on the filter unit frame. The fastener pins are carried with the filter units for ready assembly with the suspension support by a simple insert and rotate operation against the biasing force of a compression spring. The present invention affords the same superior individual self-suspension advantage of the parent application invention in an even less costly way, and offers increased installation ease as well. Thus the invention provides a number of improvements in clean room technology. The invention clean room ceilings have a less costly, more convenient, simpler, and more effective design. Sealant gels are no longer necessary. Individual filter units are self-supporting, freely of shared support with other filters requiring disturbance of adjacent filters when installing or deinstalling a single filter unit. The invention does away with the entire grid structure formerly though necessary both to support and to seal the clean room ceiling filter units against sideflows of unfiltered air. All the filters are in a plane and none need be vertically staggered as in the Gustin patent. No filter shares its final support with an adjacent filter, much less three adjacent filters as in the Madl patent. In this invention the filter units themselves carry externally their means of own individual support, eliminating the extensive grids used heretofore, and obviating the need for arbitrary spacing between adjacent filter units now left to accommodate the filter support grid. The filter units are readily shiftable into or out of position. Adjacent filter units are closer together than in conventional clean room ceilings, increasing the proportion of the ceiling that is composed of filter units, reducing air flow incursions between the filter units, its turbulence and concomitant vibration. The invention filter units and filter unit suspension assemblies cooperate to permit ready locking in place by simply shifting the filter unit into position with the fastening pin registering with the suspension support, and locking the filter to the support, from below, and without extensive screwing of threaded elements together. Conversely, the filter unit suspension assembly is simply disconnected, and from below the filter unit, for easy removal by reversing the installation process.

The filter units are sealed to each other across their narrow separation. Sideflows of air along the filter units walls are blocked by an adherent, suitably self-supporting mass or web bridging the gap between adjacent filters and lying across any possible flow path, an expedient made feasible by the close spacing of the filter units. The new filter support system is easily integrated with sprinkler systems and ceiling lamps. Blank units (rectangular panels without filters) can be substituted for filter units as need without changing the simplicity, which is the hallmark of the invention. Other features and advantages of the invention will become known from the following description.

The invention accordingly provides a clean room ceiling having multiple filter units each comprising a unit frame and, therewithin, filter media, the units being suspended in place by unshared suspension components including individual ties, to be suspended freely of other support such as a grid or other filter units, and a tie anchoring bracket within each filter unit inward of the unit frame periphery, adjacent ones of the unit frames being sealed against air leakage between units.

The invention further provides a clean room filter array comprising a plurality of individual filter units arranged for delivery of filtered air to a clean room, each individual filter unit comprising a frame and filter media fixed in the frame, the frame having an outturned flange, each filter unit having an individual suspension assembly unshared with any other filter unit and suspending the filter unit from its outturned flange, whereby each filter unit of frame and fixed filter media is shiftable to and from the array independently of shifting the position or orientation of the other filter units or altering their respective suspension assemblies.

In this and like embodiments, typically, there is further included a filter unit-adherent web extending between adjacent filter units to block air flow therebetween, the filter unit frame comprises first and second pairs of opposed frame wall sections, the filter media being mounted within said frame wall section, each of the first pair of frame wall sections having an upper edge and a lower edge and a predetermined vertical height between the upper and lower wall edges, the outturned flange being located between the wall section upper and lower edges, each outturned flange defining fastening structure; the individual filter unit suspension assembly comprising a fastening pin movably mounted to each said outturned flange at its said fastening structure, the suspension assembly fastening pin comprises an axially elongated member cooperating with the outturned flange fastening structure in fastening pin retaining relation, the fastening pin further comprises a first stop shoulder located along the length of the axially elongated member, and a compression spring element journaled on the member in first stop engaging relation, the compression spring element simultaneously engaging the outturned flange and the first stop shoulder in pin biasing relation away from the outturned flange, the outturned flange fastening structure comprises an aperture in the flange surrounded by an inner edge margin on the inner face of the flange opposing the first stop shoulder and an outer edge margin on the outer face of the flange, the fastening pin axially elongated member extending through the aperture, the fastening pin further comprising a second stop shoulder opposing the flange aperture outer edge margin, the fastening pin second stop shoulder comprises a stop rod projecting laterally from the fastening pin adapted to engage a suspension member opposite the flange, the outturned flange is a first outturned flange and is located at the frame wall section upper edge, and including also a second outturned flange opposite the first outturned flange at the frame wall section lower edge, the second outturned flange having an aperture registered with the first outturned flange aperture, the fastening pin member being journaled in both the first and second outturned flange apertures, and the first outturned flange aperture is adapted to register with a like aperture in the suspension member, the fastening pin member sized to penetrate both the first and second outturned flange apertures and the suspension member aperture with its the fastening pin stop rod engaging the suspension member about the suspension member aperture under the compression spring element bias.

In a further embodiment, the invention provides in combination: an individual filter unit adapted for arrangement in an array of filter units for delivery of filtered air to a clean room, and an individual filter unit suspension assembly adapted for suspending the filter unit from without and unshared with any other filter unit; the filter unit comprising a frame wall having first and second pairs of opposed frame wall sections and filter media mounted within the frame wall, each frame wall section of the first pair of frame wall sections having an upper edge and a lower edge and a predetermined vertical height therebetween and an outturned flange located between the wall section upper and lower edges, each the outturned flange defining fastening structure, the individual filter unit suspension assembly comprising a fastening pin movably mounted to each the outturned flange at its the fastening structure.

In this and like embodiments, typically, the suspension assembly fastening pin comprises an axially elongated member cooperating with the outturned flange fastening structure in fastening pin retaining relation, the fastening pin further comprises a first stop shoulder located along the length of the axially elongated member, and a compression spring element journaled on the member in first stop shoulder engaged relation, the compression spring element simultaneously engaging the outturned flange and the stop shoulder in pin biasing relation away from the outturned flange, the outturned flange fastening structure comprises an aperture in the flange surrounded by an inner edge margin on the inner face of the flange opposing the first stop shoulder and an outer edge margin on the outer face of the flange, the fastening pin axially elongated member extending through the fastening structure aperture, the fastening pin further comprising a second stop shoulder opposing the flange aperture outer edge margin, the fastening pin second stop shoulder comprises a stop rod projecting laterally from the fastening pin to engage a suspension member opposite the flange, the outturned flange is a first outturned flange and is located at the frame wall section upper edge, and including also a second outturned flange opposite the first outturned flange at the frame wall section lower edge, the second outturned flange having an aperture registered with the first outturned flange aperture, the fastening pin member being journaled in both the outturned flanges, there is included also a grommet sealing the fastening pin member at the second outturned flange, the first outturned flange aperture registers with a like aperture in the suspension member, the fastening pin member penetrating the first outturned flange aperture and adapted to penetrate s the suspension member aperture with its the fastening pin second stop shoulder rod engaging the suspension member about the suspension member aperture under the compression spring element bias, the first outturned flange aperture is shaped to block passage of the fastening pin member first stop shoulder, the suspension member aperture registered with the first outturned flange aperture being shaped to pass the fastening pin member and its second stop shoulder rod in a first angular orientation and to block passage thereof in a second angular orientation, and including rotation structure on the fastening pin member for effecting angular movement of the member about its own longitudinal axis, and, the fastening pin member rotation comprises a pin head adapted to interfit with a tool in rotational driving relation to drive the fastening pin member from the first to the second angular orientation.

BRIEF DESCRIPTION OF THE DRAWINGS

The invention will be further described as to an illustrative embodiment in conjunction with the accompanying drawings in which the several Figures illustrate the invention.

FIG. 14 is a view like FIG. 11 showing an alternative sealing arrangement;

FIG. 15 is a view of filter units suspended with an alternate suspension assembly;

FIG. 16 is a view in section of the filter unit suspension assembly taken on line 16—16 in FIG. 15;

FIG. 17 is a view taken on line 17—17 in FIG. 16;

FIG. 18 is a fragmentary, detail view of a filter unit having a water conduit and a sprinkler assembly incorporated therein;

FIG. 19 is a fragmentary view in section of an alternate filter unit and sprinkler arrangement; and, FIG. 20 is a fragmentary view in section of a further alternate filter unit and sprinkler arrangement.

FIG. 23A is an axonometric view of a single filter unit of the type shown in FIG. 21, before assembly with the support rods;

FIG. 23B is a view taken on line 23B in FIG. 23A;

DETAILED DESCRIPTION

As noted above, the invention provides an improved clean room ceiling, one in which the formerly used combined filter support and sealing grid is obviated in favor of the simple individual mounting of each filter unit by its own suspension assembly. Sealing is effected by a web of caulk material or tape, applied per se or formed in situ, or, if preferred, by other sealing techniques such as conventional gels without, however, the use of filter unit supporting grid troughs. The mounting and demounting of the individual filter units involves merely the insertion of a support rod into a preformed aperture in the filter unit divider, or the filter unit wall, either of which defines the suspension bracket, and fastening the unit in place. Or unfastening.

Figure 1:
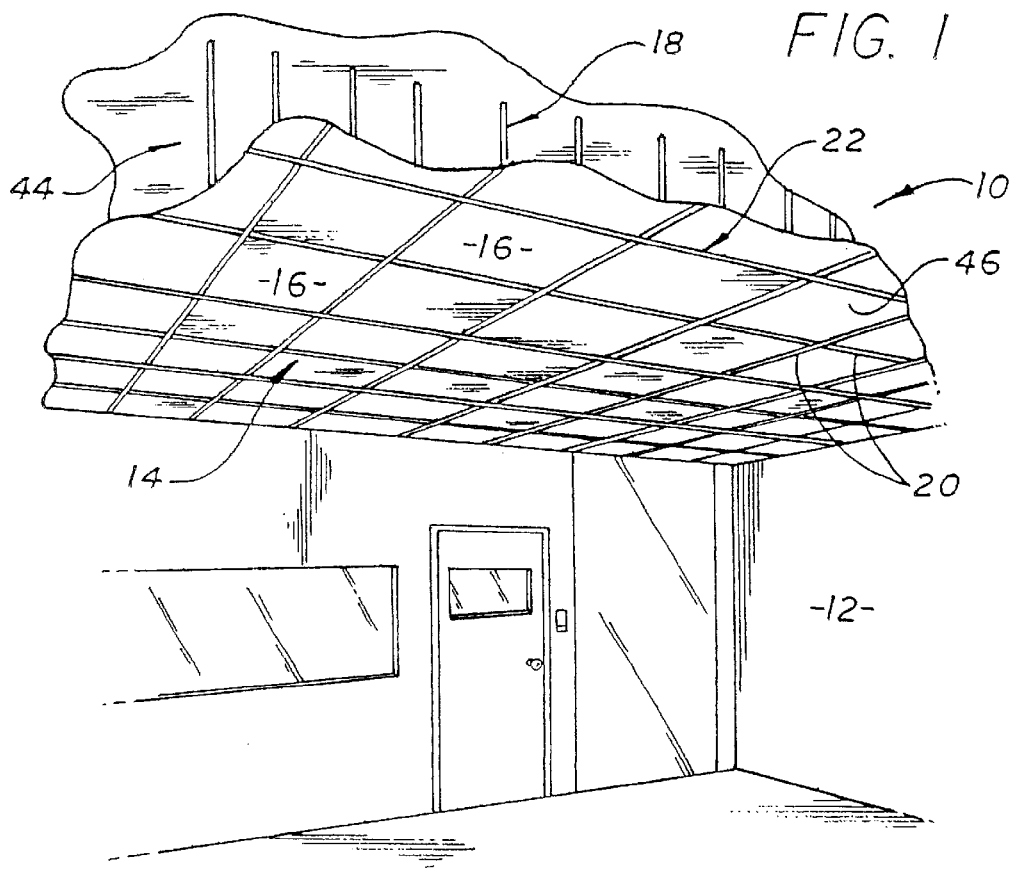
FIG. 1 is a perspective, fragmentary view of a clean room ceiling filter unit array as viewed from below.
Figure 2:
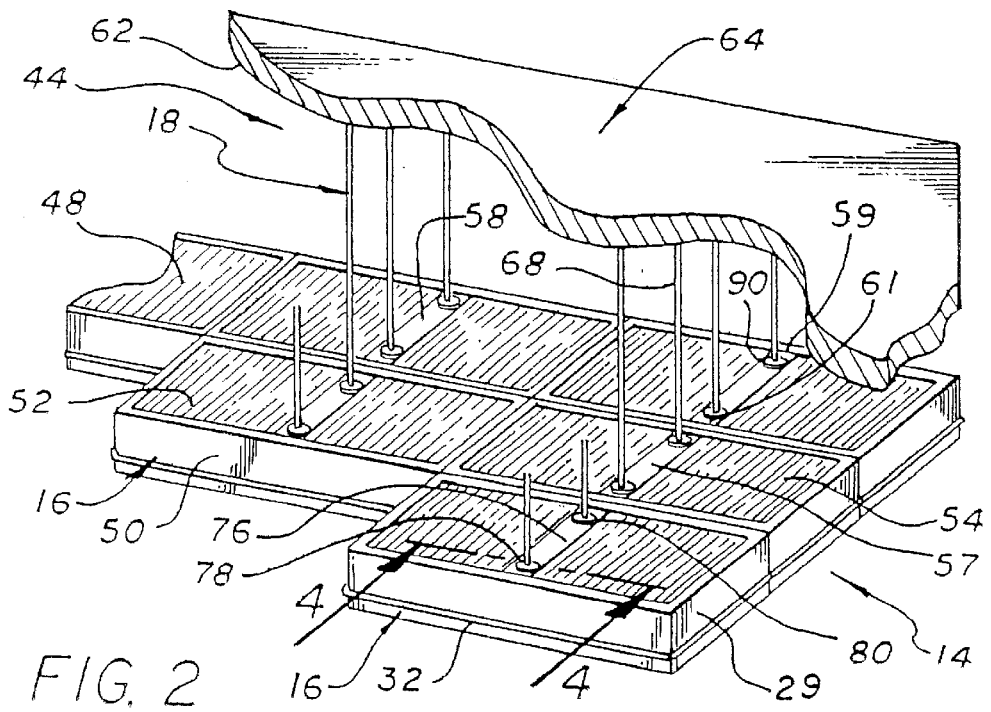
FIG. 2 is a fragmentary view of the filter array of FIG. 1, as viewed from above.
Figure 6:
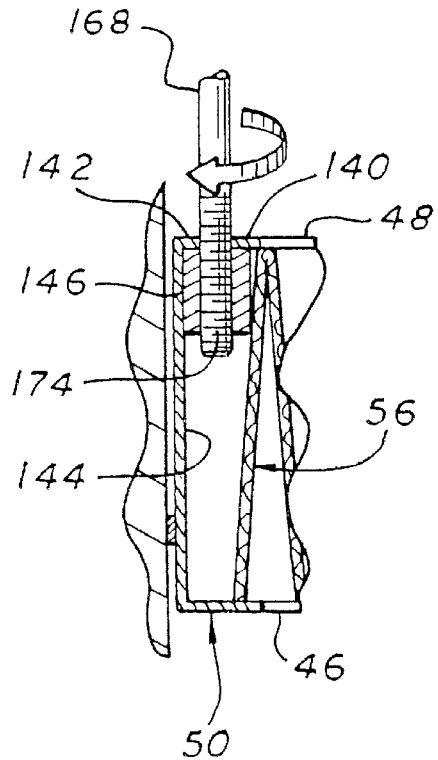
FIG. 6 is a fragmentary view in section of a further alternative support embodiment.
Figure 7:
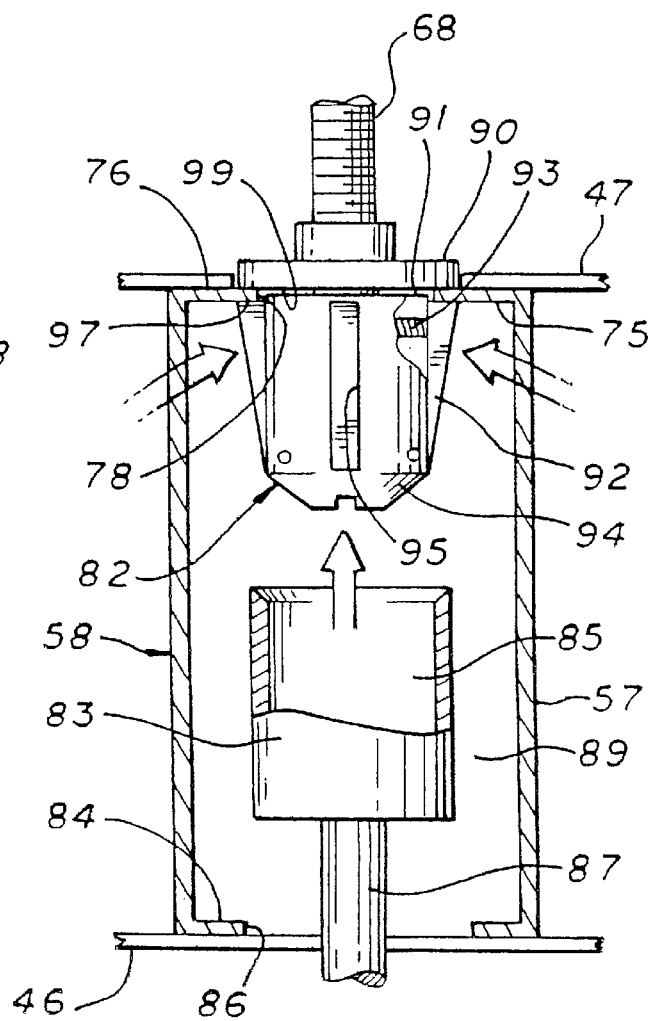
FIG. 7 is a fragmentary view like FIG. 4, but showing the fastener remover poised to deflect the latch members on the fastener.
Figure 8:
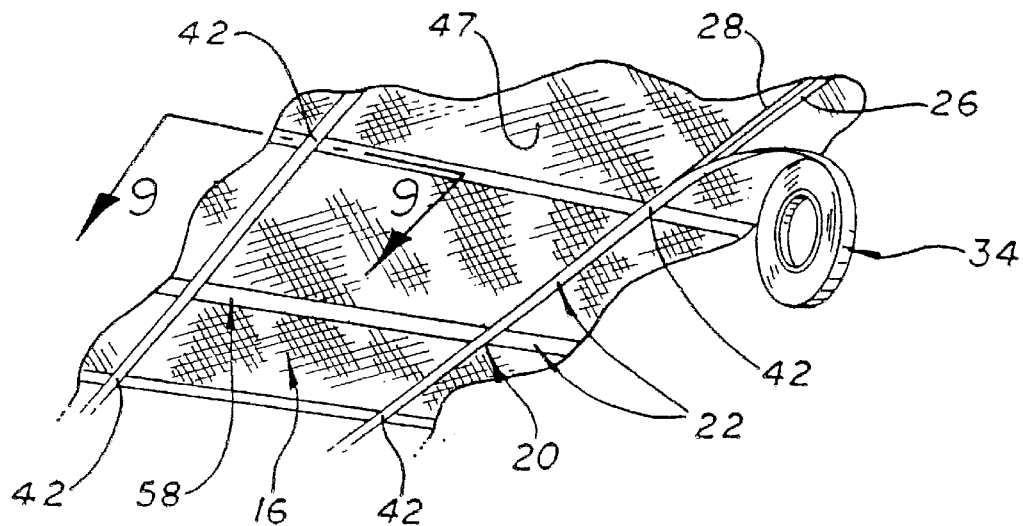
FIG. 8 is a fragmentary view of the filter unit array sealed with tape and forming a clean room ceiling.

With reference now to the drawings in detail, and as described and claimed in the applicants' parent application, in FIGS. 1–10, and particularly FIGS. 1, 2 and 8, the invention clean room is shown at 10 comprising an enclosed volume 12, and thereabove a clean room filter array 14 comprising a plurality of individual filter units 16 arranged for delivery of filtered air to the clean room enclosed volume. Each of the individual filter units 16 has its own suspension assembly 18 unshared with any other filter unit. Accordingly, each filter unit 16 is shiftable to and from the array 14 independently of shifting the position or orientation of the other filter units, and freely of, or without, altering their respective suspension assemblies 18.

It will be noted the individual filter units 16 are very nearly laterally and longitudinally abutting, thus providing little space between adjacent units, especially in comparison with prior art systems in which the filters are collectively supported by a grid structure, or other arrangement, such as corner fittings, where the mass of the filter support system actually increases the space between filters, increasing the gap to be sealed and likely allowing undue air-flow related vibration. In the present invention the separation between adjacent filter units 16 is minimally that amount needed for mechanical clearance, thus increasing the filtered area in the clean room ceiling relative to its unfiltered area over other systems.

Figure 9:
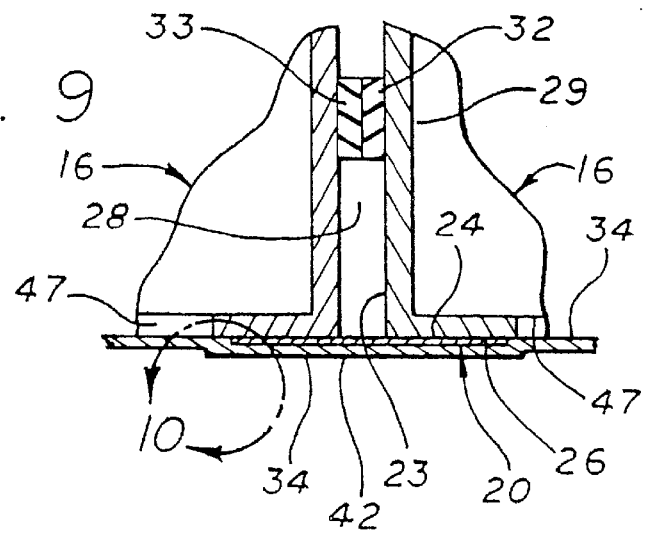
FIG. 9 is a view taken on line 9—9 in FIG. 8.
Figure 10:
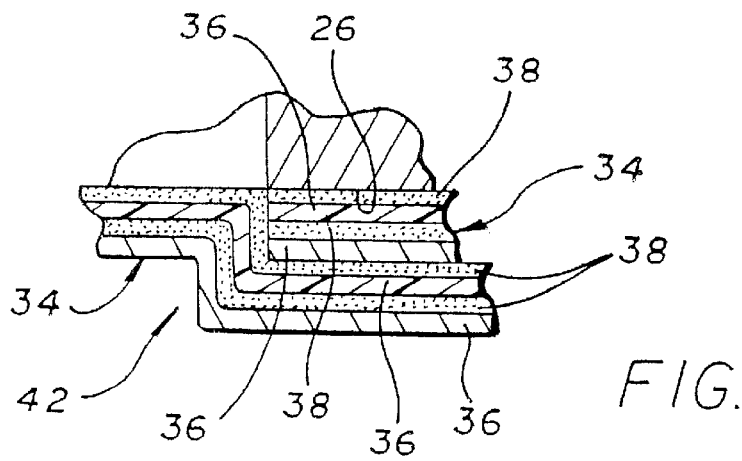
FIG. 10 is a view taken on line 10 in FIG. 9.

It is generally necessary to block air flow between adjacent filters, however, in the present design if the filters are left individually suspended and not permanently fixed together. Thus, the present invention clean room filter array 14 has air flow blocking structure 20 between adjacent filter units 16. In the FIGS. 8, 9 and 10 illustrated embodiment, the air flow blocking structure 20 comprises a filter unit 16-supported series of air impervious webs 22 is arranged to block air flow between adjacent filter units. The webs 22 are adhered to each of a pair of adjacent filter units 16, as shown, with the web edge margins 24 affixed to the front face edges 26 of the filter units so that the web bridges the gap 28 between the filter units. The gap 28 is typically small, e.g., less than twice the width of the filter unit wall 29, allowing for close spacing of the filter units 16, and the mentioned increase in proportion of filtered area in an installation, particularly over gel-dependent, grid-trough sealing systems. Each filter unit 16 suitably has a strip 32 of rubber, plastic or other, preferably elastomeric or resilient, material 33 thereon set back along the depth of the filter unit away from the filter unit front face edges 26, to provide space for adhesion of the web 22 to the edges and/or the adjacent edge margins 24. The resilient strip 32 serves as a form of partial air seal between adjacent units 16 and as well as a means of damping vibration in the array 14, such vibration being already reduced by the immediate adjacency of the juxtaposed filter units and consequent reduced air flow turbulence between the units.

In the FIGS. 8–10 illustrated embodiment, the air flow blocking structure 20 comprises air impervious web 22 in the form of a filter unit-adherent tape 34 extending between adjacent filter units 16 to block air flow therebetween.

Figure 11:
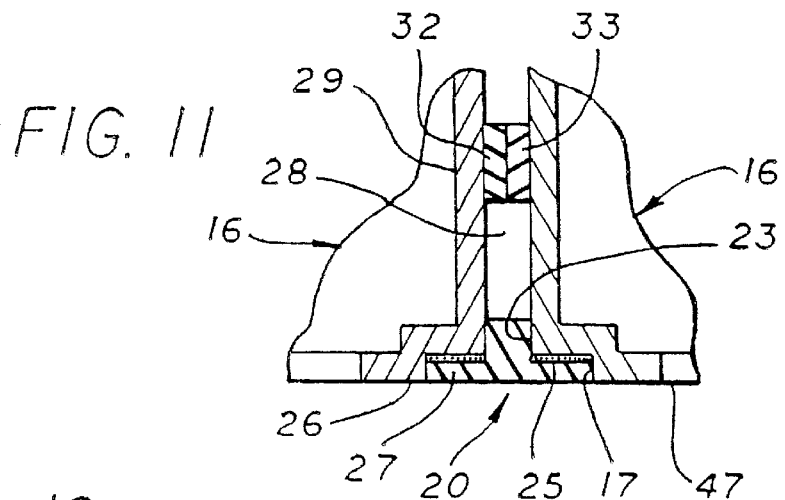
FIG. 11 is a fragmentary view in section of juxtaposed filters spaced and sealed.

In the FIG. 11 embodiment, the web 22 is in the form of an adhesive 25 held in place by a fitting 27 inserted into recess 17 between adjacent filter units 16. In the FIG. 17 embodiment, the web 22 is in the form of a rolled or otherwise formed caulking 31 which is inserted between the opposing filter units 16 so as to block air flow from the gap 28 into the clean room volume 12 (FIG. 1).

Returning to FIGS. 8–10, the tape 34 may be preformed or formed in place by painting, rolling or otherwise applying a suitably viscous paste or liquid which is film-forming upon evaporation of solvent, or by other means. Preferably, the tape 34 is a preformed structure typically comprised of one or more layers of a strong backing 36 itself made of any suitable metal, cellulosic, or plastic material, for example, and for each backing layer a strongly adhering layer 38 of adhesive material, such as isobutylene and silicone-based adhesives. Multiple layers of these and other adhering or strengthening materials can be used. In preferred embodiments, the tape 34 runs laterally of and longitudinally of the clean room filter array 14 matching the rectilinear openings of the gaps 28. Thus deployed, tape 34 has intersections 42 at intervals corresponding to the corners of filter units 16. It is important to maintain the integrity of the seal at these intersections 42. This can be done by selecting a tape 34 which is flexible enough in the backing and/or the adhesive layers 36, 38 respectively to closely fit into the inevitable folds and angles of the tape as it meets at edges or passes over itself at intersections 42. In particular, the angle of the tape 34 in rising from the filter unit 16 to cross a second segment of the tape may not be a perfect 90 degrees if the tape backing 36 material is not sufficiently flexible to bend and stay bent at 90 degrees. In this circumstance the adhesive layer 38 volume is desirably thick or great enough to bridge the typically triangular volume between differently directed crossing segments of tape 34; or other expedients can be used to obtain and maintain the desired contact and air flow imperviousness of the tape 34 at all points including tape intersections 42, such as added layers or pieces of material, compression devices, caulking, and other bonding agents, not shown.

Having detailed the sealing between filter unit 16 we will turn particularly to FIGS. 1, 2, 3 and 4. The clean room filter array 14 of a laterally and longitudinally extended plurality of individual filter units 16 is arranged for delivery of air from plenum 44 to the clean room volume 12 to the filter unit front face 46 from the filter unit rear face 48 of each filter unit 16, the individual filter units each being in combination with an individual filter unit suspension assembly 18 unshared with any other filter unit of the array.

Each filter unit 16 comprises a filter frame 50 having walls 29 suitably of aluminum or other metal but possibly of wood. Within the frame 50 and between its rear face 48 and its front face 46 are disposed left and right hand packs 52, 54 of filter media 56, the filter media lying within the filter frame walls 29. A divider 57 separates the left and right filter packs 52,54. In the past, the function of the divider 57 has been to support the filter packs 52, 54 in place and to give rigidity to the filter unit frame 50. These functions continue in the invention filter units 16, and a new function, that of a bracket to support the individual filter units from individual suspension assemblies 18, is added. Divider 57 is a box-beam configured, rigid element which is bonded to the filter frame 50 at its opposite ends 59, 61 and defines the suspension bracket 58 as will be described hereinafter.

Each suspension assembly 18, then, comprises the bracket 58 mounted within the filter frame 50, the bracket being adapted for mounting its individual filter unit 16 to the support surface 62 outside or beyond the frame and typically to the structural or true ceiling of the room in which the clean room is constructed. While the clearance between the clean room filter array 14 and the true ceiling of the surrounding room is often great, with the present invention, lower height rooms than are normally contemplated for clean room installation will be useful. Omitting the construction of the extensive trough grid and support system as allowed the present invention permits installations in places hitherto thought to be too low ceilinged for the old type of installation, or too small to permit incurring the typical grid system expense.

The filter unit array 14 is surmounted by the true room ceiling, or by a ceiling substitute such as constructed housing 64, providing support surface 62 (FIG. 2) and which with the filter unit array 14 forms the plenum 44. The filter media packs 52, 54 are open to enclosed volume 12 at the front face 46 of the filter units 16 and the plenum 44 at the rear face 48 of the filter units.

The suspension assembly 18 further comprises a rod 68 or other elongated member adapted in its length, diameter, strength and conformation to connect the filter unit suspension bracket 58 to the support surface 62 at the room ceiling or elsewhere, in spaced relation of the filter unit frame 50 to the supporting surface. The suspension assembly elongated rod member 68 extends from the support surface 62 to the bracket 58 connected to the filter unit frame 50 and preferably located within the plane of said filter media packs 52, 54, or within or adjacent the plane of the filter unit frame.

The rod 68 is usefully threaded at 74 or carries other cooperating structure with the bracket 58 for securing the bracket to the rod. Typically in the embodiment of these Figures, the rod 68 extends through the filter unit frame rear face 48 and not to the filter unit frame front face 46, so as to terminate within the filter unit frame 50 and generally within the plane of the filter media packs 52, 54.

The suspension assembly bracket 58, as mounted in the filter unit frame 50, intersects with the elongated rod member 68 at or near its cooperating thread structure 74 and within the perimeter of said filter unit frame. Forming the bracket 58, the divider 57 extends transversely of the filter unit frame 50 and has a shoulder portion 75, generally corresponding to a portion of the divider top wall 76. The divider shoulder portion 75 is locally apertured to have in this embodiment of the invention front and rear mounting holes 78, 80 into which the rods 68 are interfittable so as to support the individual filter unit 16 by addition of a fastener 82 to the threaded portion 74 of the rod 68. The fasteners 82 block separation of the rods 68 from holes 78, 80 as shown. The divider 57 is interiorly open between the filter unit face 46 and location of said fastener 82 on rods 68, the fastener being sized to be movable through the open interior of the divider.

Access to the fasteners 82 may advantageously be from the front face 46 of the filter unit 16. For this purpose, front wall 84 of the divider 57 preferably has additional holes, e.g., hole 86, in registration with holes 78, 80 and sized to pass the fasteners 82 up to the threaded portion 74 of rod 68.

With particular reference to FIG. 7, a tool 83 comprising a socket 85 mounted on a shank 87 is sized to pass through hole 86 for carrying a fastener 82 toward or from the rod 68 so as to have the fastener traverse the open interior 89 of the divider 57 in a controlled manner while not requiring the leaving open any great portion of the face 46 of the filter unit 16. The fastener 82 is thus readily accessible through hole 86 for purposes of insertion and tightening or untightening and removal of the fastener. It will be noted that the tool socket 85 will overfit fastener 82 and collapse its latch fingers 92 for purposes now to be explained.

Figure 4:
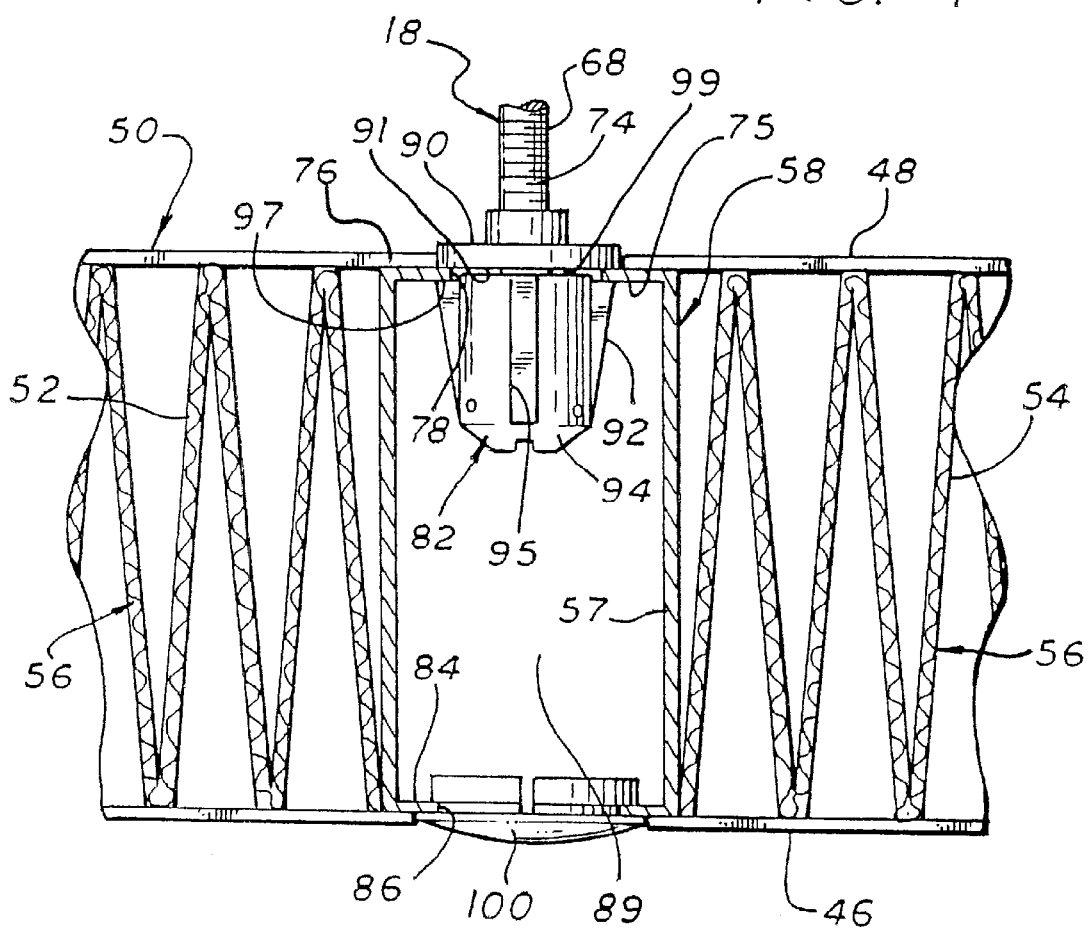
FIG. 4 is a view taken on line 4—4 in FIG. 2.

With reference particularly to FIGS. 1, 4 and 7, in a typical clean room filter array installation using the invention filter units 16 and suspensions 18, a plurality of rods 68 are suspended from the support surface 62. The rods 68 carry leveling plates 90 at a predetermined, measured height within the room enclosed volume 12. Plates 90 will be level one with another and are used to line up the filter units 16 at the same height.

Figure 5:
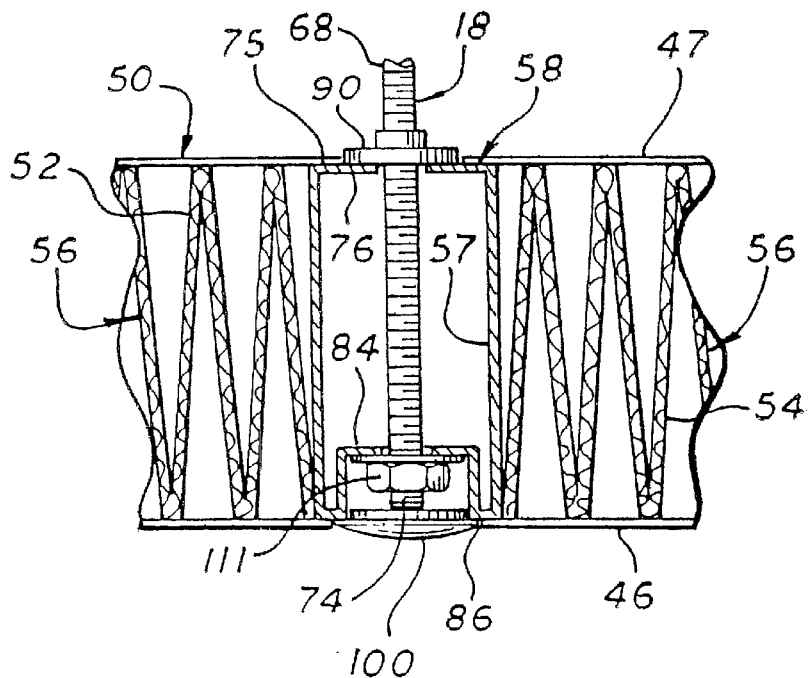
FIG. 5 is a fragmentary view in section of the filter unit in an alternative support embodiment.

Suspension fasteners 82 are designed for quick installation of the filter array 14. Each fastener 82 comprises a fastener body 94 having, e.g. four, circumferentially distributed, vertically disposed body slots 95 in each of which a shiftable latch finger 92 is carried in pivoting relation for movement in and out of the body slots. Compression springs 93 (FIG. 7) seated within slots 95 resiliently urge the fingers 92 outward to a locking position as shown in FIGS. 5 and 7 unless retracted by the tool 83, for example. Shifted outward, the latch fingers 92 bear against the divider shoulder portion 75. The fastener 82 is threaded onto the suspension member rod 68 threaded portion 74 to a predetermined position, as shown. This position provides a gap 91 equal to approximately the thickness of the divider top wall 76 between the upward edges 97 of the spring loaded fingers 92 and the downward face 99 of the plates 90. In the installed condition of a filter unit 16, the divider top wall 76 is disposed in the gap 91 between the latch fingers 92 and the plate 90. The filter unit divider mounting holes 78, 80 also function to close up the spring loaded fingers 92. Divider mounting holes 78, 80 are each sized to pass over the fastener 82 when the fingers are retracted, or shifted inwardly, and are desirably sized to effect the inward shifting themselves. Easy installation of the individual filter units 16 is thus provided as will now be described.

To install filter units 16, the suspensions 18 are arranged as just described with the rods 68 depending from a support surface 62, and in a pattern to register with the filter units. Plates 90 are at a predetermined, uniform level. See FIG. 2. A fastener 82 is threaded onto the threaded portions 74 of each rod 68 to a level to establish the desired gap 91. At each pair of suspension rods 68 a filter unit 16 is presented, oriented to have the front face 46 facing downward (assuming a ceiling supported installation) and the rear face 48 facing upward. The filter unit divider mounting holes 78, 80 are registered with the depending fasteners 82 and thus rods 68. The filter unit 16 is pushed upward such that the fasteners 82 pass through the divider mounting holes 78, 80. In this operation the holes 78, 80 close the fingers 92 against springs 93 until the fastener 82 latch fingers pass the holes and enter the divider interior 89. The spring loaded fingers 92 then shift outward, and as thus deployed engage the divider shoulder portion 75 as the filter unit 16 is allowed to rest upon the fastener fingers. The plate 90 limits the upward movement of the filter unit 16 in coordination with the fastener 82 passage through mounting hole 78, 80. The extended fastener fingers 92 support the filter unit 16 suspended in place. The access hole 86 is then suitably closed with a plug 100 that is readily removable in case it is desired to demount the filter unit 16. For demounting, the plug 100 is removed, the tool 83 is inserted through hole 86 to enclose the fastener 82 and close the fingers 92 into their fastener body slots 95. The fastener 82 will then pass back through hole 78 allowing the filter unit 16 to drop by force of gravity. It will be noted that adjacent filter units are not disturbed in their position or at their mountings by the addition or removal of one or several filter units in the just-described manner.

Figure 13:
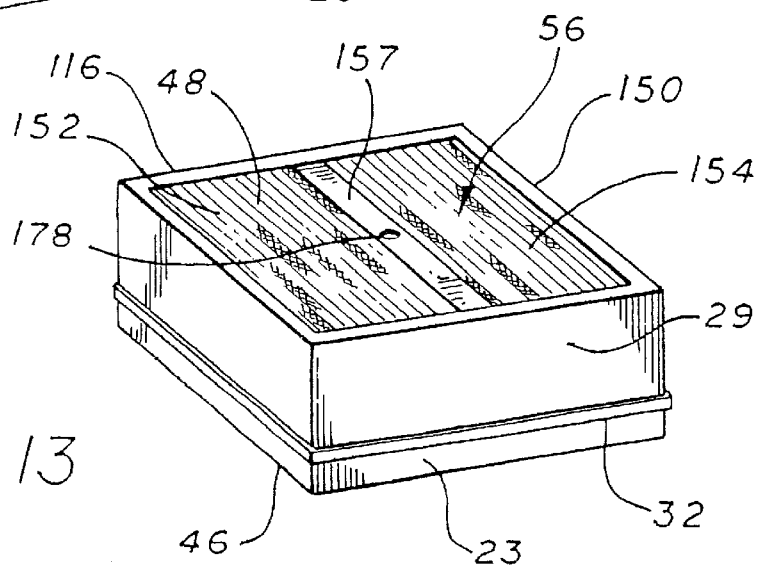
FIG. 13 is a view like FIG. 3, but of a single mounting point filter unit.

The filter units can have a single mounting point rather than two. In FIG. 13, filter unit 116 comprises a frame 150, filter packs 152, 154 and has a divider 157. Divider 157 has a single mounting hole 178. Mounting of the filter unit 116 is as with filter unit 16 using the same suspension assembly as previously described, except that there is a single rod mounting locus at hole 178 and it is centered on the filter unit divider 157.

Figure 3:
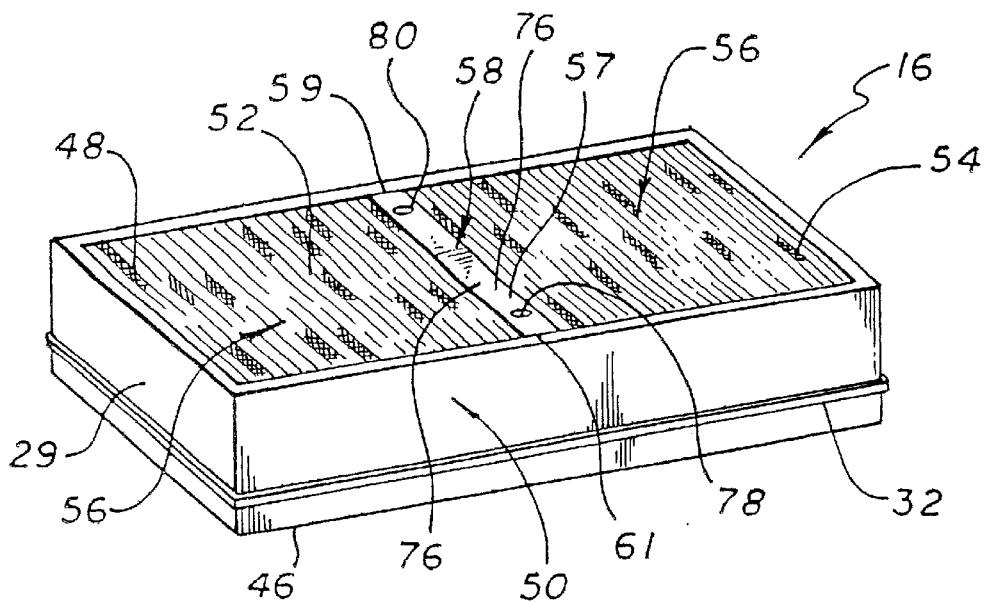
FIG. 3 is an axonometric view of a single filter unit before assembly with the support rods.
Figure 12:
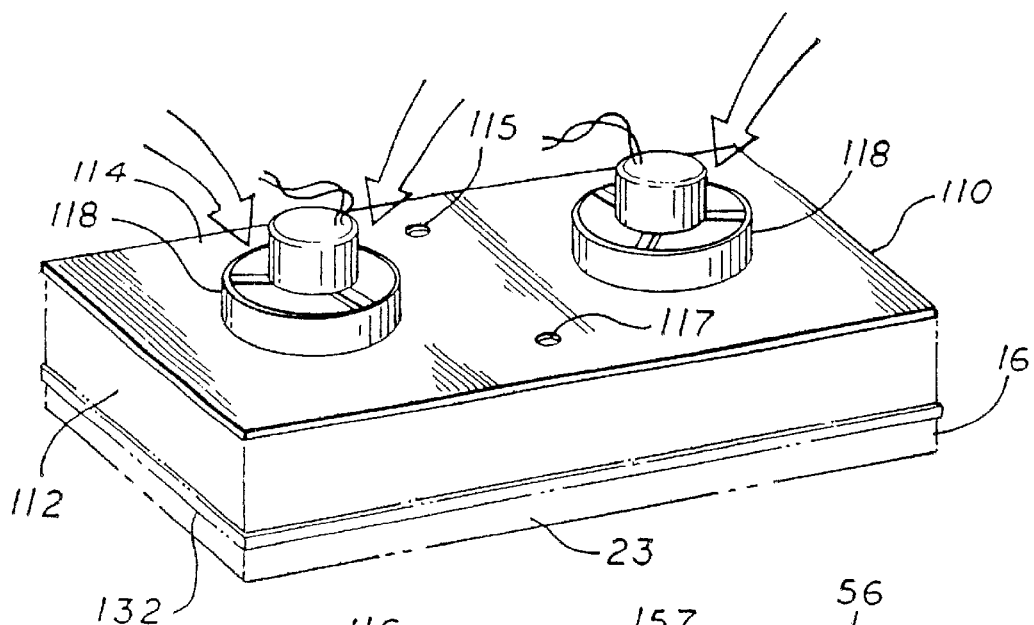
FIG. 12 is a view of a filter and plenum combination embodiment of the invention.

Other filter unit arrangements within contemplation of the invention include self-contained units in which the filter frame and filter packs are incorporated into or combined with a hood or housing enclosure having is own blowers and defining its own plenum rather than using a common plenum as in the FIG. 2 embodiment. With reference to FIG. 12 of the accompanying drawings, housing enclosure 110 has sidewalls 112, top wall 114 and a pair of blowers 118. A resilient strip 132 surrounds the housing enclosure 110, for partially sealing the unit to adjacent units and lessening vibration of units. The filter frame and filter packs (not shown) may be unitary structures fixed within the housing enclosure 110 or comprise one or more of the filter packs and filter frames such as shown in FIGS. 2, 3 and 13. The suspension arrangement is also the same, except that the housing enclosure top wall 114 defines mounting holes 115, 117 rather than the divider of a filter frame.

The location and style of the fastener can be varied to meet different needs. For example, the fastener can be of different configurations from that shown in FIGS. 4 and 7, be placed in different locations, including outside the front face of the filter unit, or within the perimeter of the filter. In FIG. 5, for example, the rod 68 extends nearly the full height of the filter unit frame 50 and is secured adjacent hole 86 by fastener nut 111 and washer 113 acting against the front wall 84 of the divider 57, which is suitably inwardly deflected at 109 to accommodate the fastener nut. Plug 100 then is used to close up the opening formed by the deflection 109.

In FIG. 6, for another example, suspension rod 168 depends from a support surface (not shown) and has its threaded portion 174 extending through a hole 140 in the top wall 142 of the side 144 of the frame 150 beyond the filter unit rear face 48. The rod 168 is secured by threaded connection to a fixed nut 146 just beyond the filter media 56.

In FIGS. 15, 16 and 17, individual filter unit 216 of a series array is supported from a support surface (not shown) by four suspensions 218 each comprising a rod 268 having a threaded portion 274. Filter unit 216 comprises a frame 250 and has filter packs 252 and 254 disposed therein. Divider 257 fixed to frame 250 at divider ends 259, 261 separates the media filter packs 252, 254. In this embodiment, the frame 250 has a perimetrical upper flange 251 and a perimetrical lower flange 253 surrounding the frame wall 229. Upper flange 251 is pierced with holes 287, 280 adjacent the corners of the frame 250. Rod 268 passes through holes 278, 280, and, in the embodiment shown, passes through a fastener 282 held in place by nut 263 by which the rod is secured to the filter frame 250. Fastener 282 has front and rear fingers 292 spring loaded as in previous embodiments of the fastener to shift outward when not blocked by the holes 278, 280 so as to support the filter unit 216 in position against the plate 290. Strip 32 of resilient material 33 is also provided in this embodiment, secured to the outer face of lower flange 253. This strip 32 will abut an adjacent strip 32 on the next filter unit 216 in the array.

Clean room filter arrays are typically provided with lighting systems and fire prevention systems such as sprinklers. In the present invention, one or more of the filter units may be replaced with a dummy unit, or a lighting unit designed to be compatible with the other filter units in the array, being similarly suspended for example. In FIGS. 18–20 typical sprinkler variations are shown for the present invention. In general, and with reference first to FIG. 18, the sprinkler supply pipe or downcomer 275 is inserted vertically through the divider 57, suitably through a space 276 located between or beside the suspension holes (not shown) and a sprinkler head 277 secured thereto. The downcomer 275 is conveniently passed through a guide conduit 279 fixed in the divider 57 by clamping ring 281 secured by nuts 283 its position being supported by guide ring 285. Caulking 287 about the downcomer 275 provides sealing against air leakage.

In another embodiment shown in FIG. 19, a simple pipe downcomer 295 which supports head 297 is inserted between left and right divider sections 357, 457, guided by ring 300, supported in place by ring 301, nuts and bolts 302 and sealed there by welding or caulking 303. In FIG. 20 the pipe downcomer 304 passes through a single chamber divider 557, sealed at the top by sealing disk 305 and at the bottom by sealing disc 306 and fastener 307.

With reference now to FIGS. 21–31, newly described in this application, the fastening of the filter units is by means of outturned flanges and spring-loaded pins that are operated between engaged and disengaged positions from within the room and enable the rapid and secure mounting of the filter units without having to be above the filter array. The invention accordingly provides a clean room ceiling having multiple filter units each comprising a unit frame and, fixed therewithin, filter media, the units being suspended in place by unshared suspension components including individual suspension members held horizontally adjacent the filter units from a suspension rod, to be suspended freely of other support such as a grid or other filter units, and a member anchoring outturned flange bracket outboard of each filter unit, adjacent ones of the unit frames being sealed against air leakage between units.

Figure 21:
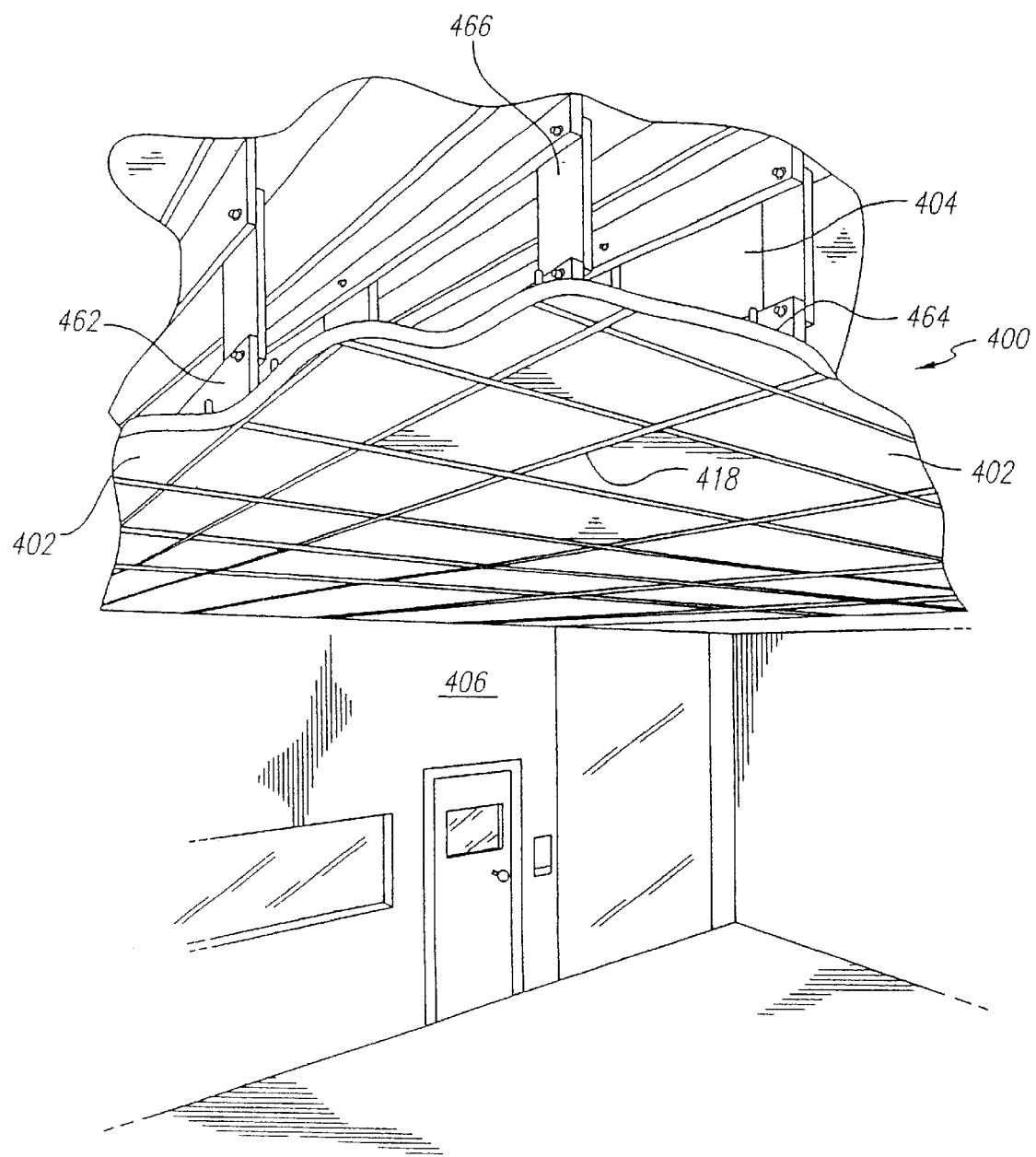
FIG. 21 is a perspective, fragmentary view of an alternate embodiment clean room ceiling filter unit array as viewed from below.
Figure 22:
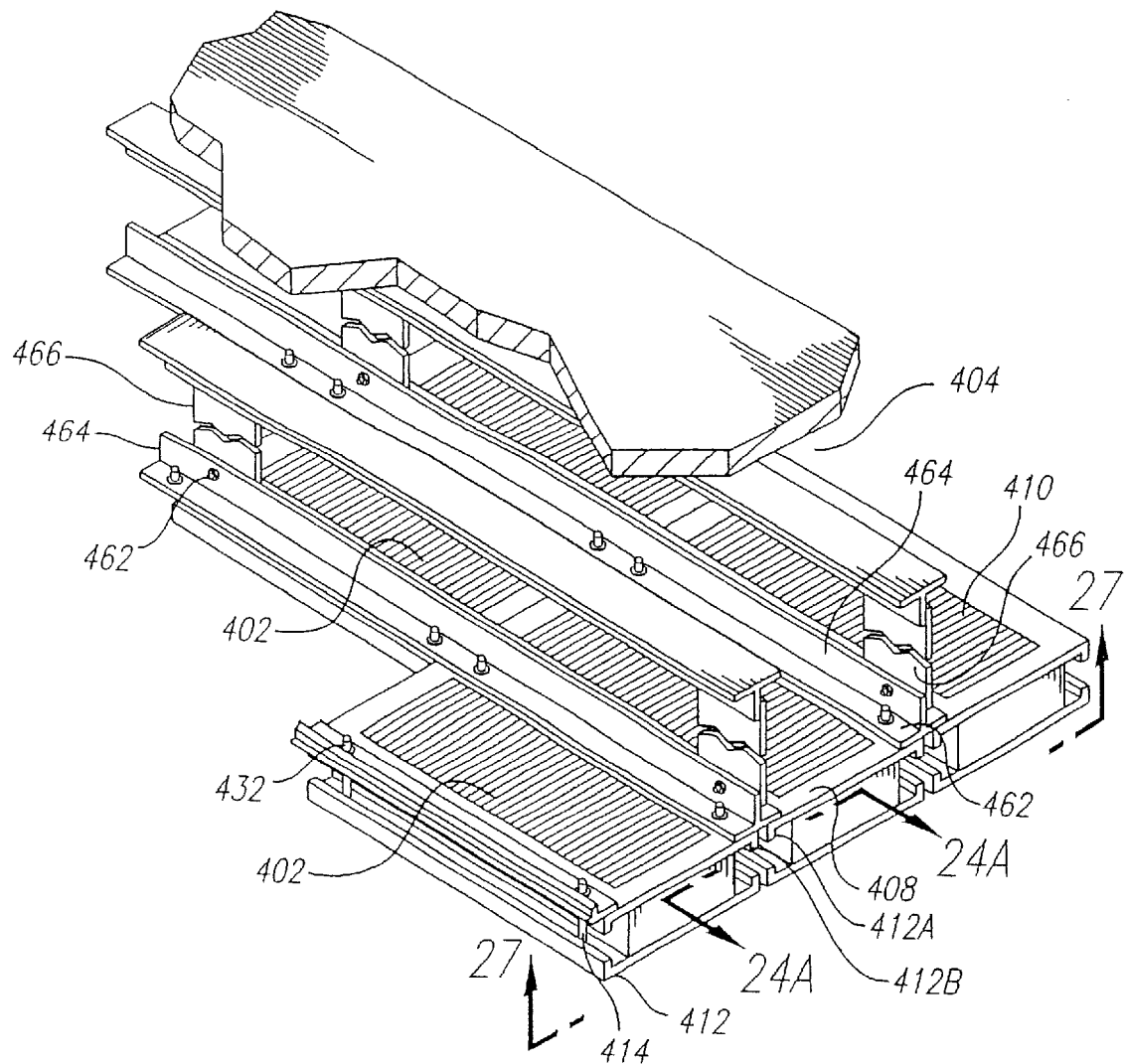
FIG. 22 is a fragmentary view of the filter array of FIG. 21, as viewed from above.
Figure 24A:
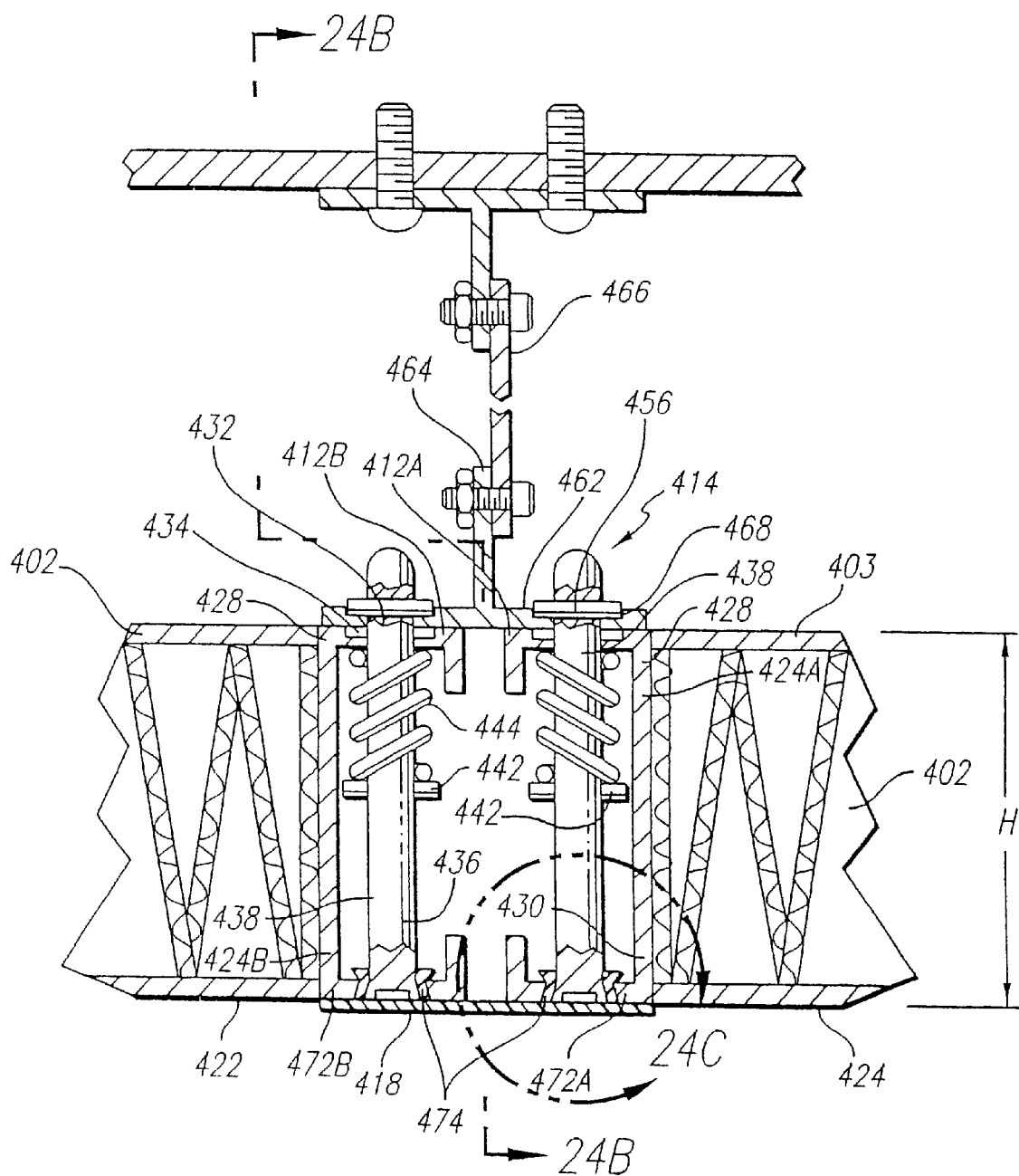
FIG. 24A is a fragmentary view in section of the alternate embodiment filter unit.
Figure 24B:
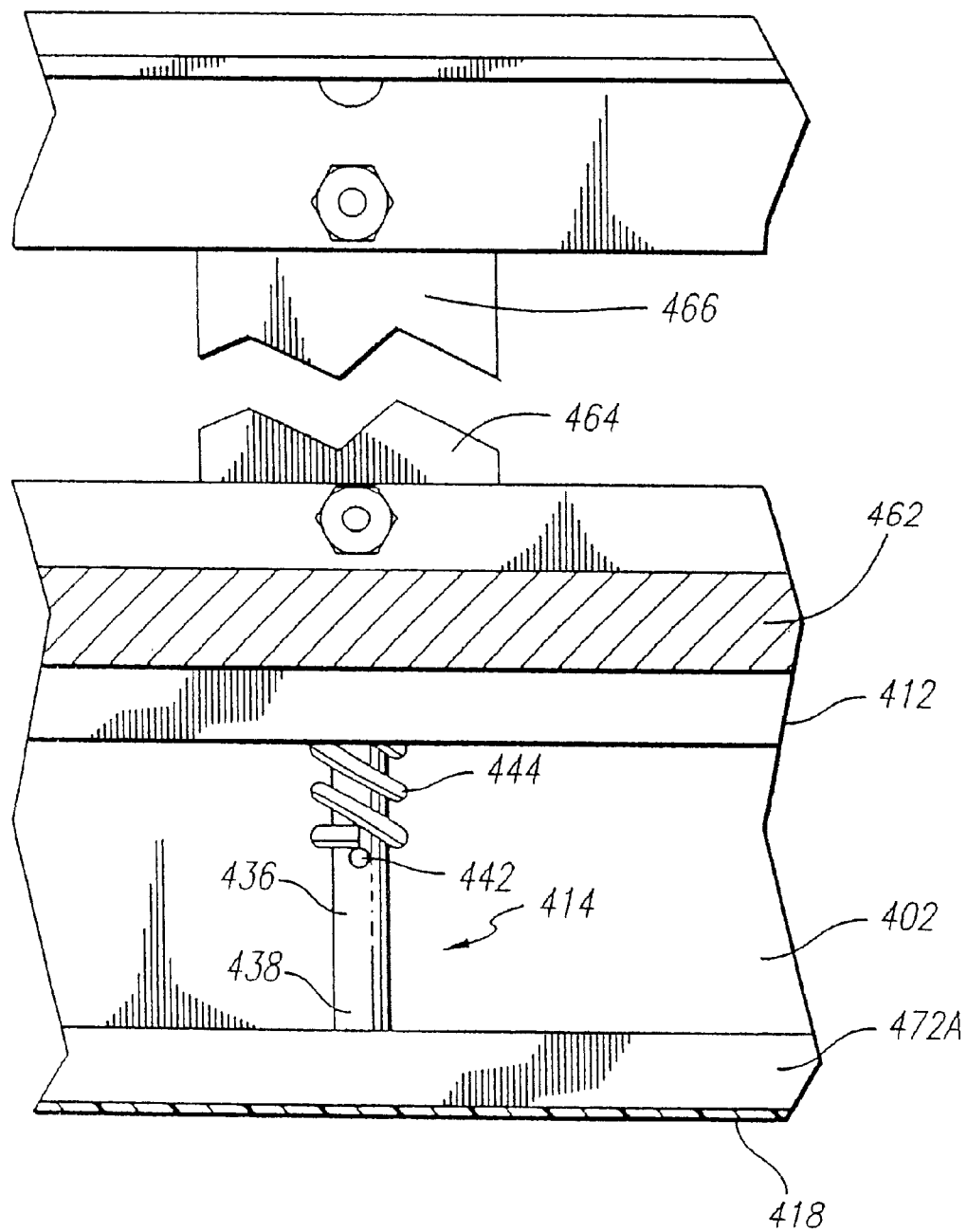
FIG. 24B is a view taken on line 24B in FIG. 24A.
Figure 24C:
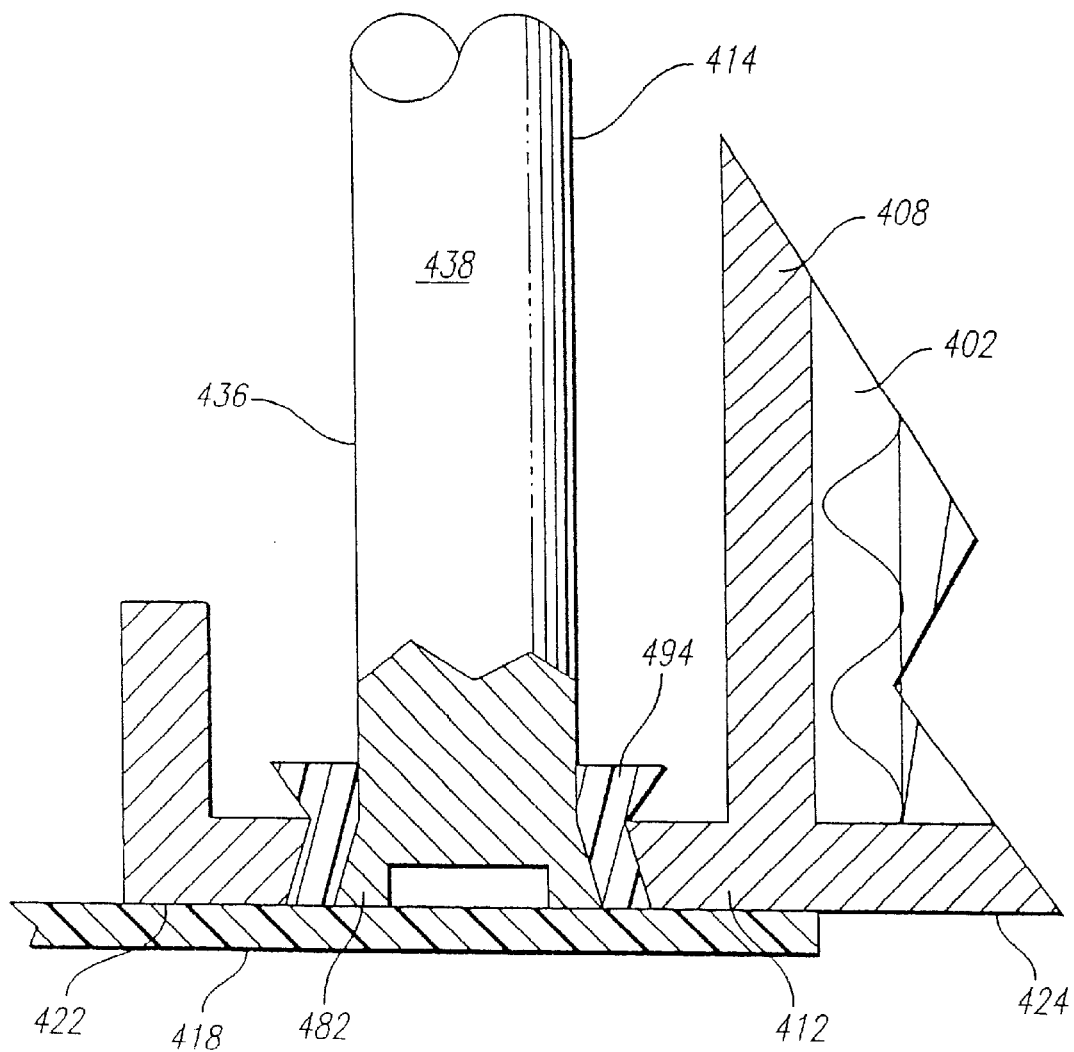
FIG. 24C is a view taken on line 24C in FIG. 24A, and showing the grommet seal.
Figure 25:
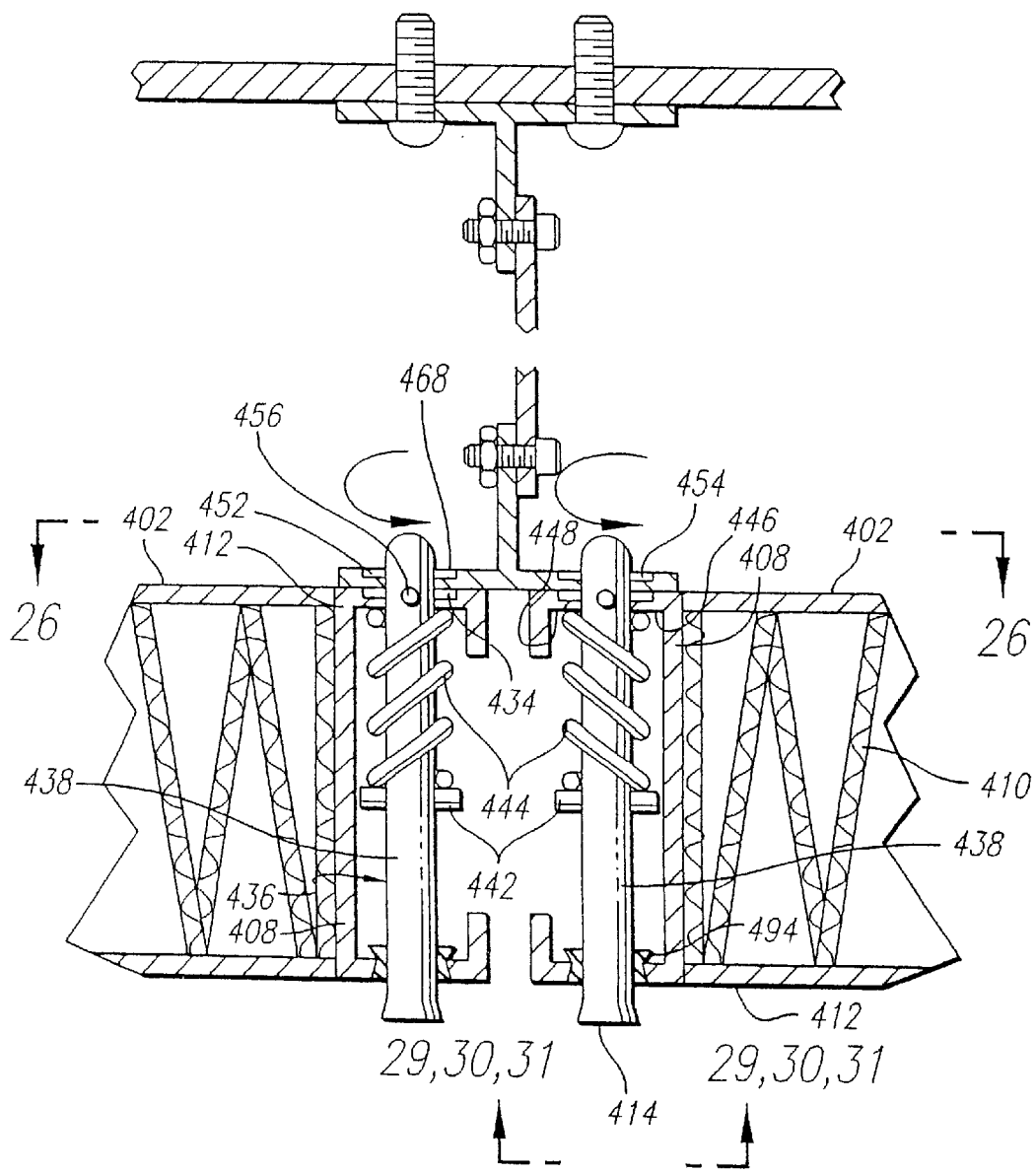
FIG. 25 is a view like FIG. 24A showing the fastener pins retracted before engagement.
Figure 26:
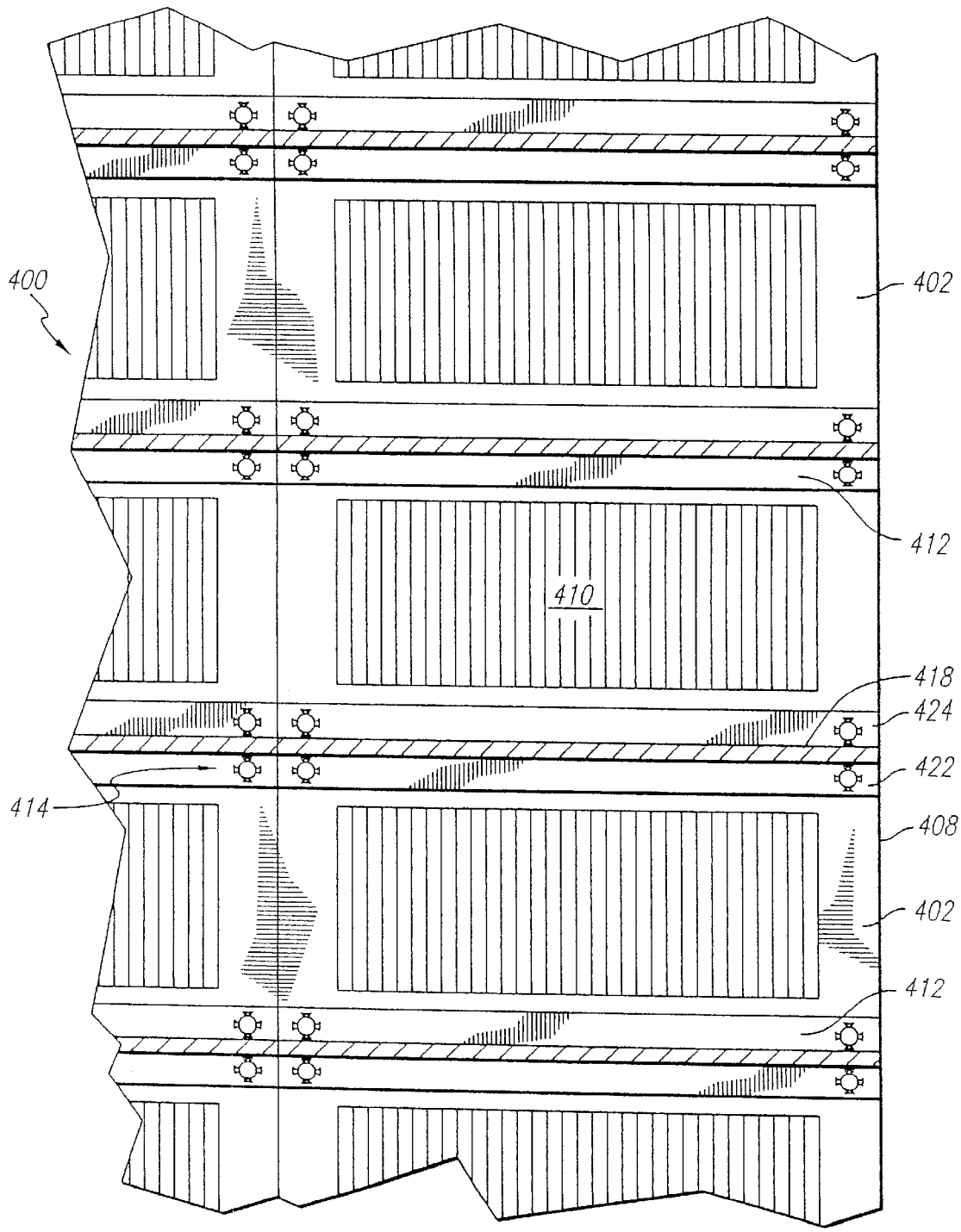
FIG. 26 is a taken on line 26—26 in FIG. 25.
Figure 27:
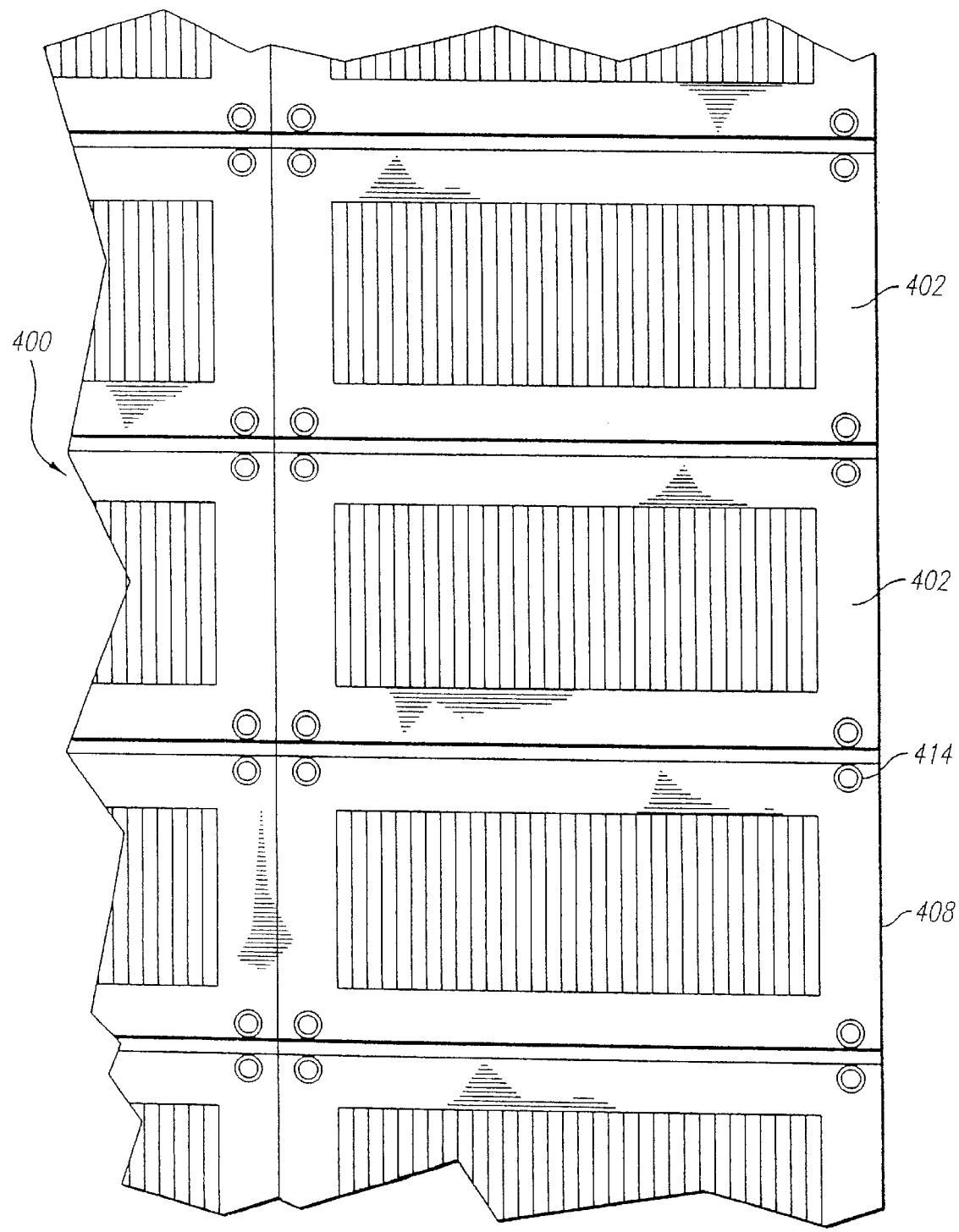
FIG. 27 is a view of the opposite side of the ceiling shown in FIG. 26.
Figure 28:
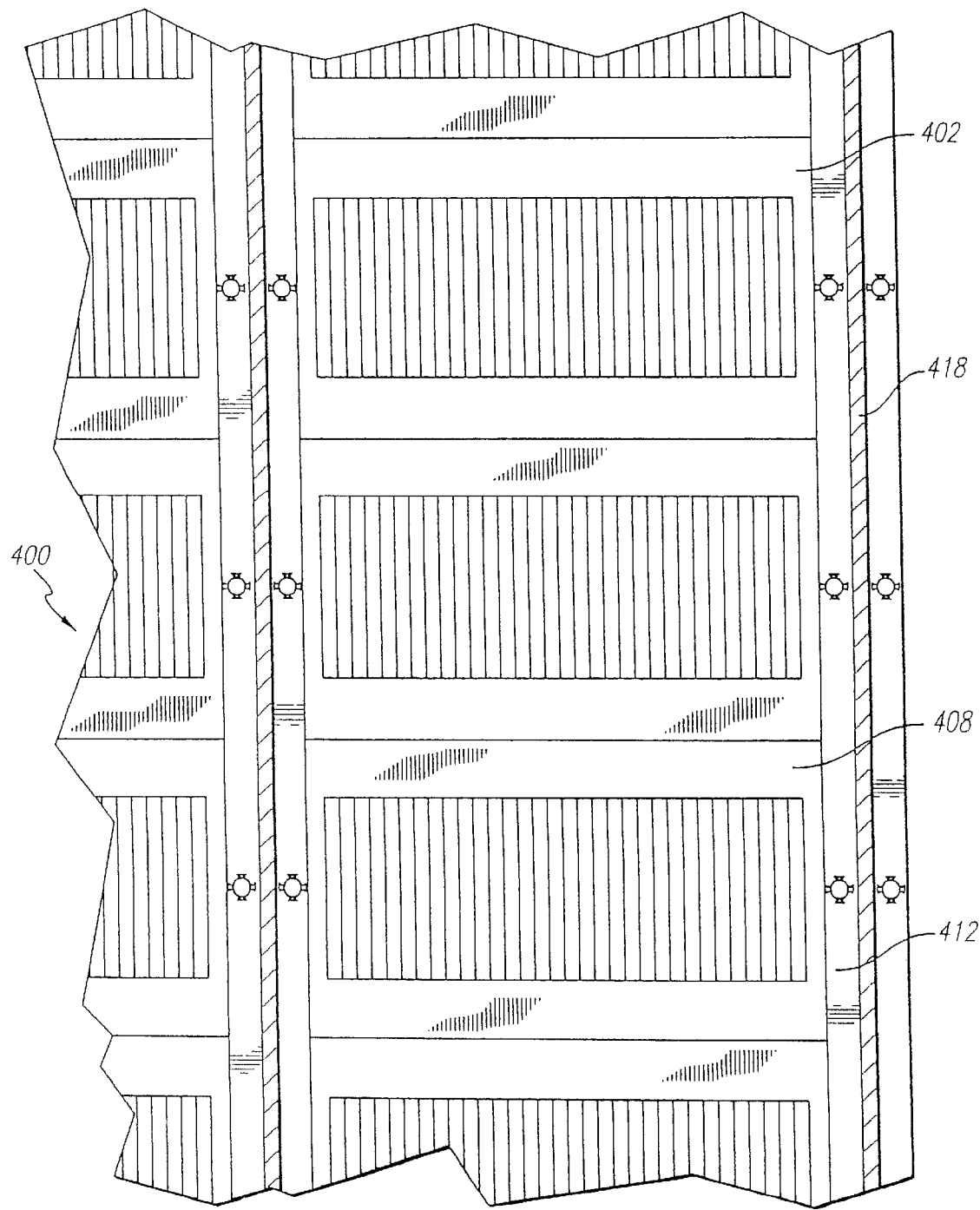
FIG. 28 is a view like FIG. 27 of an alternate pattern of support.

In FIG. 21, the invention clean room filter array is shown at 400 comprising a plurality of individual filter units 402 arranged for delivery of filtered air from plenum 404 to a clean room 406. Each individual filter unit 402 comprises a frame 408 and filter media 410 fixed in the frame. The frame 408 has an outturned flange 412. Each filter unit 402 has an individual suspension assembly 414 unshared with any other filter unit, arranged to suspend the filter unit from its outturned flange 412. As in the previous embodiments, the present filter units 402 comprising the frame 408 and the fixed filter media 410 is shiftable to and from the array 400 of filter units independently of shifting the position or orientation of the adjacent other filter units or altering their respective suspension assemblies.

As in previous embodiments, the filter units 402 are sealed against flow of air between the units, typically with a tape 418 or other filter unit-adherent web attached to the faces 422, 424 of adjacent filter units 402, 403 (FIG. 24A) and extending between them to block air flow therebetween.

The filter unit frame 408 (FIG. 23A) comprises first and second pairs 424, 426 of opposed frame wall sections 424A and 424B, and 426A and 426B, respectively, the filter media 410 being mounted within the frame wall sections. Each of the first pair 424 of frame wall sections 424A and 424B have an upper edge 428 and a lower edge 430 and a predetermined vertical height H between the upper and lower wall edges. Outturned upper flanges 412A, 412B are located on frame wall section 424A and 424B, respectively. These oppositely facing flanges 412A and 412B are positioned between the wall section upper and lower edges 428, 430, that is not above or below these edges, and in the illustrated embodiment at the upper edge 428, as shown.

Each the outturned flange 412A, 412B defines fastening structure 432 shown in the Figure in the form of a fastening pin-receiving aperture 434. The individual filter unit suspension assembly 414 comprising a fastening pin 436 movably mounted to each outturned flange 412A, 412B at its fastening structure aperture 434. The suspension assembly fastening pin 436 comprises an axially elongated member 438 cooperating with the outturned flange fastening structure aperture 434 in fastening pin-retaining relation. The fastening pin 436 further comprises a first stop shoulder 442 located along the length of the axially elongated member 438, and a compression spring element 444 centrally mounted for sliding and/or rotational movement, i.e. journaled, on the member in first stop shoulder engaging relation. The compression spring element 444 simultaneously engages its outturned flange 412A or 412B, depending on where the fastening pin is located, and the first stop shoulder 442 in pin biasing relation away from the outturned flange. The outturned flange fastening structure aperture 434 in the flange 412A, 412B (FIG. 25) is surrounded by an inner edge margin 446 on the inner face 448 of the flange opposing the first stop shoulder 442 and an outer edge margin 452 on the outer face 454 of the flange. The fastening pin axially elongated member 438 extends through the aperture 434, FIG. 23B.

The fastening pin 436 further comprises a second stop shoulder 456 opposing the flange aperture outer edge margin 452. Fastening pin second stop shoulder 456 comprises a stop rod 458 projecting laterally (radially) from the fastening pin. The stop rod 458 is a typically a cylindrical body that projects sufficiently to engage a common support shown as suspension member 462 positioned opposite a flange 412A, 412B. Suspension member 462 is best shown in FIGS. 22, 23A, 23B and 24A and comprises an angle beam 464 extending horizontally and supported by plates 466 extending from ceiling mounted supports so that the angle beams 464 are parallel with the filter unit flanges 412A, 412B. Suspension member angle beam 464 is apertured along its length to define apertures 468 opposite to and registered with apertures 434 in flanges 412A, 412B. Fastening pins 436 extend through the flange apertures 434 and the suspension member angle beam apertures 468 as more particularly describe hereinafter.

The outturned flanges 412A, 412B are upper or first outturned flanges. A second, lower pair of outturned flanges 472A, 472B are also provided opposite the outturned flanges 412A, 412B and located at the frame wall section lower edge 430. Second outturned flanges 472A, 472B have a fastening pin-receiving aperture 474 registered with the first outturned flange aperture 434. The fastening pin member 438 is journaled in both the first and second outturned flange apertures 434, 474, and with the first outturned flange aperture 434 registered with aperture 468 in the suspension member angle beam 464. Fastening pin member 438 is sized in terms of length and diameter to penetrate both the first and second outturned flange apertures 434, 474 and the angle beam aperture 468. Angle beam aperture 468 is suitably slotted to pass the stop rod 458 in a first parallel-to-the-slot orientation, and to block passage when the stop rod is at a different, not parallel orientation. See FIG. 23B. Fastening pin stop rod 458 engages the suspension member angle beam aperture upper face edge margin 476 surrounding the aperture 468 by rotation from a parallel orientation to an off-parallel orientation where it is kept engaged against the edge margin 476 by compression spring element 444 bias, the spring element pushing the first stop shoulder 442 away from the upper flange 412A, 412B and thus drawing the fastening pin member 438 downward until the second stop shoulder 456 fully engaged. To prevent vibration or other disturbance from shifting the second stop shoulder stop rod 458 to a parallel orientation with the aperture 468, and thus to a potentially passing condition, detents 478 are provided to cam the stop rod 458 to be retained in a nonparallel condition.

Figure 29:
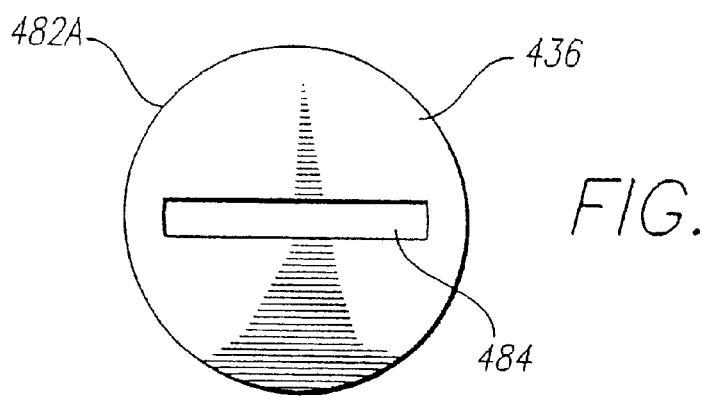
FIGS. 29–31 are views taken on lines 29—29, 30—30, and 31—31, respectively, in FIG. 25 and shown different forms of pin rotation structure.
Figure 30:
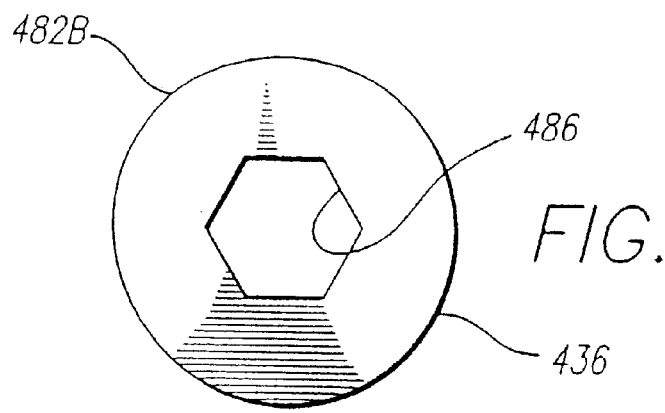
Figure 31:
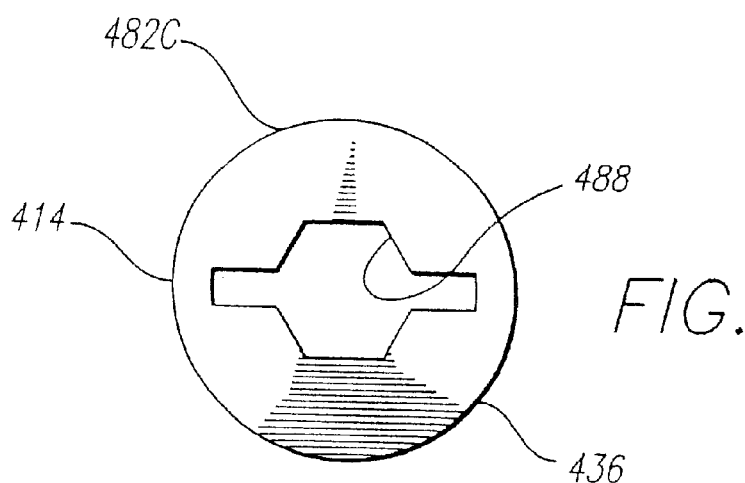

For intended fastening pin member rotation between different orientations, the fastening pin 436 has a pin head 482 with one or another kind of rotational structure adapted to interfit with a complementary tool. In FIGS. 29, 30 and 31 three different pin head rotational structures are shown. In FIG. 29 pin head 482A has a simple slot 484 that will interfit with a screwdriver blade. In FIG. 30 pin head 482B has a hexagonal recess 486 for a suitably shaped wrench. In FIG. 31 a pin head 482C is shown with a combination slot and hexagonal shaped recess 488 for either a blade or wrench type tool. Male fittings can also be used on the pin heads 482.

The fastening pins 436 are generally shipped installed with the filter units, the pins being movably captured in the flange apertures 434. On site, the filter units 402 are lifted into place against the suspension member 462 and the pin second stop shoulder stop rods 458 eased through the suspension member angle aperture 468 and rotated to lock the filter unit by its flanges 412A, 412B to the suspension member 462. Because of the simplicity of this insert-and-turn mounting technique, filter installation can usually be handled by one worker working from the room side of the filter array whether the units are held with fastening pins 436 at the filter unit corners 490, or midway at 492 along the filter long side frame wall sections 426 or short side frame wall sections 424; compare FIGS. 26 and 28. Sealing of the apparatus against unfiltered airflow is provided by the sealing tape 418 and/or by the grommets 494 at the point of entry of the fastening pins 436 into the filter unit lower flange apertures 474.

There is accordingly provided in accordance with the invention clean room ceilings of a less costly, more convenient, simpler, and more effective design. Sealant gels are no longer necessary. Individual filter units are self-supporting, freely of shared support with other filters. Eliminated is the entire grid structure of the prior art formerly thought necessary both to support and to seal the clean room ceiling filter units against sideflows of unfiltered air. All the filters of the invention are in a plane and none need be vertically staggered. No filter shares its support with any filter, much less with three adjacent filters. The invention filter units themselves carry internally or externally but automatically their means of own individual support, not only eliminating the extensive grids used heretofore, but also obviating the need for arbitrary spacing between adjacent filter units left to accommodate the filter support grid in previously known clean room ceilings. The filter units, being individually self-supporting, are added into or removed from a ceiling array without disturbing the laterally or longitudinally adjacent filter units. The filter units are readily shiftable into or out of position. Adjacent filter units are closer together than in conventional clean room ceilings, increasing the proportion of the ceiling that is composed of filter units, reducing air flow incursions between the filter units, its turbulence and concomitant vibration. The invention filter units and filter unit suspension assemblies cooperate to permit ready locking in place by simply shifting the filter unit into position against the installed suspension member locking the filter to the support, from below. Conversely, the filter unit is simply dismounted, and from below the filter unit, for easy removal by reversing the installation steps. The filter units are sealed to each other across their narrow separation. Blank units (rectangular panels without filters) can be substituted for filter units as needed without changing the simplicity that is the hallmark of the invention.

We claim:

1. A clean room filter array comprising a common support suspended from a ceiling, a plurality of individual filter units arranged for delivery of filtered air to a clean room, each said individual filter unit comprising a frame and filter media fixed in said frame, said frame having an outturned flange, each said filter unit having an individual suspension assembly unshared with any other filter unit and suspending said filter unit from said common support by its said outturned flange, whereby each said filter unit of frame and fixed filter media is shiftable to and from the array independently of shifting the position or orientation of the other filter units or altering their respective suspension assemblies.

2. The clean room filter array according to claim 1, including also a filter unit-adherent web extending between adjacent filter units to block air flow therebetween.

3. The clean room filter array according to claim 1, in which said filter unit frame comprises first and second pairs of opposed frame wall sections, said filter media being mounted within aid frame wall section, each of said first pair of frame wall sections having an upper edge and a lower edge and a predetermined vertical height between said upper and lower wall edges, said outturned flange being located between said wall section upper and lower edges, each said outturned flange defining fastening structure; said individual filter unit suspension assembly comprising a fastening pin movably mounted to each said outturned flange at its said fastening structure.

4. The clean room filter array according to claim 3, in which said suspension assembly fastening pin comprises an axially elongated member cooperating with said outturned flange fastening structure in fastening pin retaining relation.

5. The clean room filter array according to claim 4, in which said fastening pin further comprises a first stop shoulder located along the length of said axially elongated member, and a compression spring element journaled on said member in first stop engaging relation, said compression spring element simultaneously engaging said outturned flange and said first stop shoulder in pin biasing relation away from said outturned flange.

6. The clean room filter array according to claim 5, in which said outturned flange fastening structure comprises an aperture in said flange surrounded by an inner edge margin on the inner face of said flange opposing said first stop shoulder and an outer edge margin on the outer face of said flange, said fastening pin axially elongated member extending through said aperture, said fastening pin further comprising a second stop shoulder opposing said flange aperture outer edge margin.

7. The clean room filter array according to claim 6, in which said fastening pin second stop shoulder comprises a stop rod projecting laterally from said fastening pin adapted to engage a suspension member opposite said flange.

8. The clean room filter array according to claim 7, in which said outturned flange is a first outturned flange and is located at said frame wall section upper edge, and including also a second outturned flange upper opposite said first outturned flange at said frame wall section lower edge, said second outturned flange having an aperture registered with said first outturned flange aperture, said fastening pin member being journaled in both said first and second outturned flange apertures.

9. The clean room filter array according to claim 8, in which said first outturned flange aperture is adapted to register with a like aperture in said suspension member, said fastening pin member sized to penetrate both said first and second outturned flange apertures and said suspension member aperture with its said fastening pin stop rod engaging said suspension member about said suspension member aperture under said compression spring element bias.

10. In combination: a common support suspended from a ceiling, an individual filter unit adapted for arrangement in an array of filter units for delivery of filter air to a clean room, and an individual filter unit suspension assembly adapted for suspending said filter unit from said common support without said filter unit and unshared with any other filter unit; said filter unit comprising a frame wall having first and second pairs of opposed frame wall sections and filter media mounted within said frame wall, each frame wall section of said first pair of frame wall sections having an upper edge and a lower edge and a predetermined vertical height therebetween and an outturned flange located between said wall section upper and lower edges, each said outturned flange defining fastening structure, said individual filter unit suspension assembly comprising a fastening pin movably mounted to each said outturned flange at its said fastening structure.

* * * * *